United States Patent

Ikemura

Patent Number: 5,848,304
Date of Patent: Dec. 8, 1998

[54] CAMERA HAVING AUTOMATIC PROGRAM ZOOM MODE

[75] Inventor: Masayuki Ikemura, Osaka, Japan

[73] Assignee: Minolta Co., Ltd., Osaka, Japan

[21] Appl. No.: 74,740

[22] Filed: Jun. 10, 1993

Related U.S. Application Data

[63] Continuation of Ser. No. 722,541, Jun. 26, 1991, abandoned.

[30] Foreign Application Priority Data

Jun. 27, 1990 [JP] Japan ................................. 2-170708

[51] Int. Cl.⁶ .................................................. G03B 17/00
[52] U.S. Cl. ........................................... 396/77; 396/157
[58] Field of Search .................. 354/400, 402, 354/195.1; 396/77, 157

[56] References Cited

U.S. PATENT DOCUMENTS

| | | | |
|---|---|---|---|
| 3,834,796 | 9/1974 | Komine | 350/187 |
| 4,737,814 | 4/1988 | Nakajima . | |
| 4,829,333 | 5/1989 | Inoue et al. | 354/412 |
| 4,942,417 | 7/1990 | Miyazawa et al. | 354/195.1 |
| 4,951,075 | 8/1990 | Tokumaru et al. | 354/195.1 |
| 4,999,663 | 3/1991 | Nakamura | 354/415 |
| 5,006,877 | 4/1991 | Katoh et al. . | |
| 5,055,932 | 10/1991 | Hijikaia | 354/402 |
| 5,075,709 | 12/1991 | Ueyama | 354/195.1 |
| 5,113,214 | 5/1992 | Nagata et al. | 354/402 |
| 5,138,354 | 8/1992 | Okada et al. . | |

FOREIGN PATENT DOCUMENTS

| | | |
|---|---|---|
| 63-169629 | 7/1988 | Japan . |
| 3-105331 | 5/1991 | Japan . |

*Primary Examiner*—Russell E. Adams
*Attorney, Agent, or Firm*—Burns, Doane, Swecker & Mathis, LLP

[57] ABSTRACT

Photographing operation of a camera is possible in an automatic program zoom mode in which focal length of a photographing lens is automatically determined based on a prescribed program, and in a manual zoom mode in which focal length of the photographing lens is determined dependent on user's preference. When a switch for starting operation of the camera is turned ON, the automatic program zoom mode is automatically set from the two modes.

20 Claims, 34 Drawing Sheets

FIG. 24

| CODE | EXAMPLE OF DISPLAY | CODE | EXAMPLE OF DISPLAY |
|---|---|---|---|
| 0) 0 | 0 | 20) k | k |
| 1) 1 | 1 | 21) L | L |
| 2) 2 | 2 | 22) M | M |
| 3) 3 | 3 | 23) n | n |
| 4) 4 | 4 | 24) o | o |
| 5) 5 | 5 | 25) p | p |
| 6) 6 | 6 | 26) q | q |
| 7) 7 | 7 | 27) r | r |
| 8) 8 | 8 | 28) s | s |
| 9) 9 | 9 | 29) t | t |
| 10) A | A | 30) U | U |
| 11) b | b | 31) v | v |
| 12) c | c | 32) – | |
| 13) d | d | 33) – | – |
| 14) E | E | 34) y | y |
| 15) F | F | 35) z | z |
| 16) G | G | 36) | |
| 17) H | H | | |
| 18) i | i | | |
| 19) J | J | | |

CAMERA HAVING AUTOMATIC PROGRAM ZOOM MODE

This application is a continuation of application Ser. No. 07/722,541, filed Jun. 26. 1991, now abandoned.

BACKGROUND OF THE INVENTION

1. Field of the Invention

The present invention relates to a camera having a plurality of photographing modes, and more specifically to a camera having an automatic program zoom mode in which a basic photographing mode can be changed.

2. Description of the Related Art

Cameras having an auto program zoom mode (hereinafter referred to as the APZ mode) have been available. In such cameras, the APZ mode and the normal mode are switched by using a mode selecting switch.

Since the conventional camera having the APZ mode is structured as described above, the APZ mode could not be automatically set by turning on the main switch. Consequently, even if the user desires to take a photograph in the APZ mode, it cannot be done immediately after turning on of the main switch.

The APZ mode means a photographing mode in which focal length of the photographing lens can be automatically determined based on the object distance, when the photographing magnification is determined.

SUMMARY OF THE INVENTION

An object of the present invention is to automatically set an automatic program zoom mode in which an appropriate focal length of a photographing lens is automatically determined based on a prescribed program, at the start of operation of a camera.

Another object of the present invention is to set an automatic program zoom mode in which the focal length of a photographing lens is automatically determined based on a prescribed program, when various states are initialized at the start of operation of a camera.

The above described objects of the present invention can be attained by a camera in accordance with the present invention, comprising: a starter for starting operation of the camera; a selector for selecting an automatic program zoom mode in which the focal length of a photographing lens is automatically determined based on a prescribed program, and a manual zoom mode in which the focal length of the photographing lens is determined by an arbitrary operation; and a controller for making the selector select the automatic program zoom mode, when the operation of the camera is started by the starter.

Since the camera includes the above components, the automatic program mode is automatically set when the operation of the camera is started.

In accordance with another aspect of the present invention, the camera comprises a starter for starting operation of the camera; initial state setting apparatus for setting the state of the camera to a prescribed state, when the operation of the camera is started by the starter; and a selector for selecting an automatic program zoom mode in which the focal length of a photographing lens is automatically determined based on a prescribed program, and a manual zoom mode in which the focal length of the photographing lens is determined by an arbitrary operation; wherein the initial state setting apparatus sets the camera to the automatic program zoom mode, regardless of the mode selected by the selector.

Since the camera includes the above components, the automatic program zoom mode is set when the states of the camera are initialized at the start of the operation of the camera.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 24 shows LCD displays corresponding to segment control data.

DESCRIPTION OF THE PREFERRED EMBODIMENTS

Embodiments of the present invention will be described in the following with reference to the figures.

Figure 1:
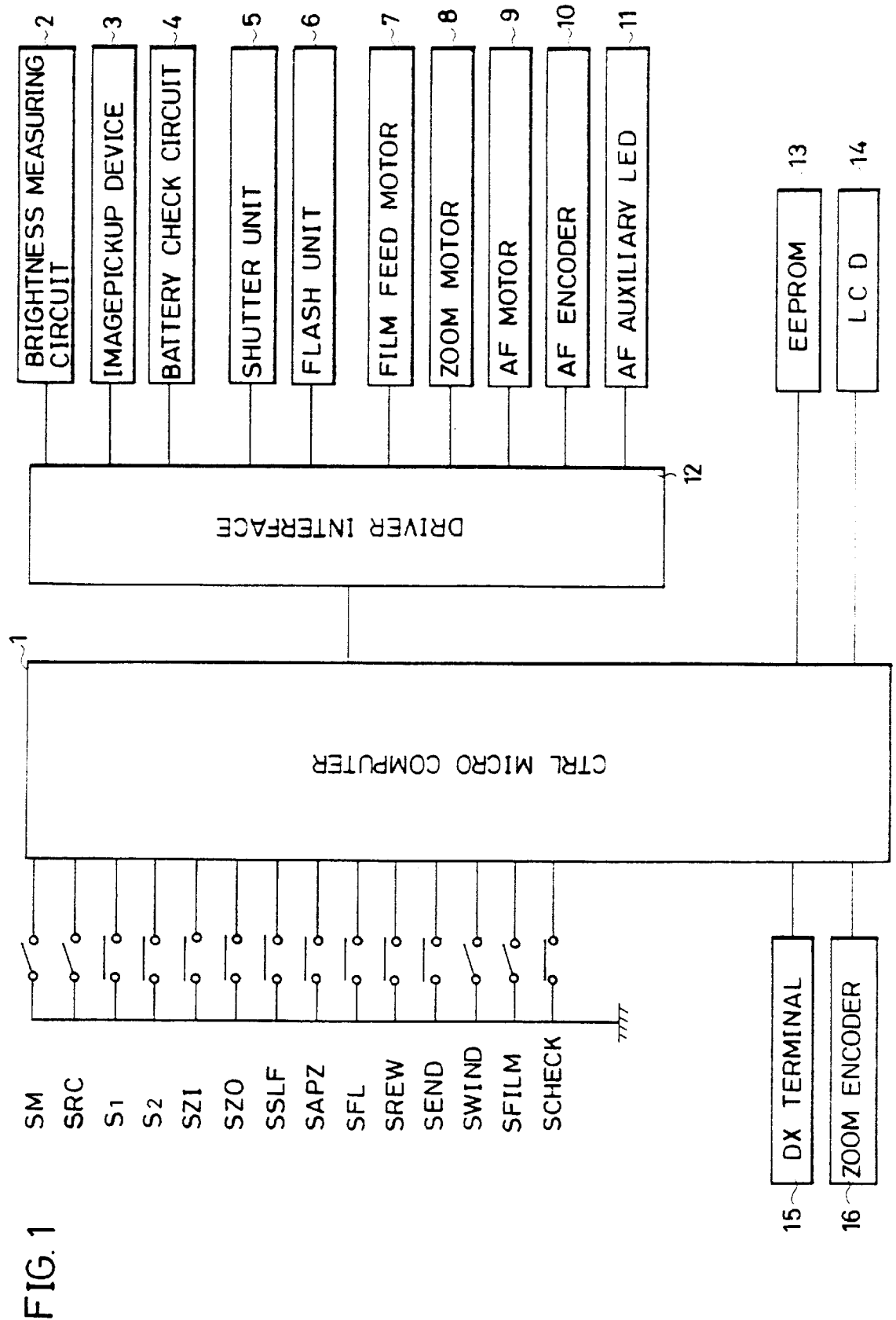
FIG. 1 is a block diagram showing a control portion of a camera.

FIG. 1 is a block diagram showing the whole structure of a camera in accordance with one embodiment of the present invention. Referring to the figure, a control portion of the camera includes a controlling 8-bit microcomputer 1. The microcomputer includes an operating unit for executing logical operations; a microprocessor including an accumulator for temporarily storing data and various registers; a ROM (Read Only Memory) storing control program; a RAM (Random Access Memory) used as a work area for writing/reading data during execution of programs; and a RAM for LCDs controlling displays of the LCDs (Liquid Crystal Displays). The content of display of the LCD is determined by the value of the RAM for the LCD. The content of display is changed by rewriting the value in the RAM for the LCD. Since turning on/off of the LCD display as a whole can be independently controlled, the LCD display can be temporarily turned off while maintaining the content to be displayed. The microcomputer 1 controls the operation of the camera as a whole, the details of which will be described later. The following elements are connected to the microcomputer 1. A brightness measuring circuit 2 measures photographing field brightness by dividing into two the brightness at the peripheral portion and at the central portion of the photographing field, and outputs signals corresponding to the peripheral brightness or the central brightness. An image pickup device 3 (for example, a CCD) is for detecting a focusing condition and determining a distance by a so called phase difference detecting method. A battery check (hereinafter referred to as BC) circuit 4 outputs signals corresponding to a voltage of a battery, not shown. A shutter unit 5 is a lens-shutter type shutter, carrying out exposure based on a signal from the microcomputer. An electronic flash unit 6 charges a capacitor for a flash, switches preemission and main emission, and emits flash light, based on signals from the microcomputer 1. The flash circuit will be described later. A film feeding motor 7 winds up a film, initially loads the film and rewinds the film based on the signals from the microcomputer 1. A zoom motor 8 carries out zooming in a photographing optical system, a viewfinder optical system and a flash emitter, not shown, based on signals from the microcomputer 1. Possible range of zooming is 35 mm to 105 mm. An autofocus (hereinafter referred to as AF) motor 9 carries out focusing based on signals from the microcomputer 1. An AF encoder 10 encodes amounts of rotation of the AF motor 9. An AF auxiliary LED 11 emits light when brightness is low or when an object of low contrast is to be photographed, based on signals from the microcomputer 1. These elements are connected to the microcomputer 1 through a driver interface 12. An EEPROM (Electrically Erasable and Programmable ROM) 13 stores data for adjustment and the like as a nonvolatile memory. A LCD (Liquid Crystal Display) 14 displays information for photographing of the camera based on signals from the microcomputer 1. A DX terminal 15 inputs signals based on DX code of a film cartridge to the microcomputer 1. A zoom encoder 16 inputs signals based on focal length of the photographing optical system to the microcomputer 1.

Various switches will be described in the following. When each switch is ON, a "L" level signal is input to the microcomputer 1, and if it is OFF, a "H" level signal is input to the microcomputer 1. When a main switch SM is ON, various functions of the camera, that is, brightness measurement, AF, exposure control, winding/rewinding of the film, control of the flash emission are allowed. Initial loading can be carried out even if the main switch SM is OFF. A back lid open/close detecting switch SRC detects whether the back lid is opened/closed. This switch is ON when the back lid is open, and it is OFF when the back lid is closed. When the switch SRC is changed from ON to OFF, initial loading is started. A switch Sl is turned ON when a shutter release button is pressed to a first stroke, starting brightness measurement and distance measurement. When an auto program zoom (hereinafter referred to as APZ) mode is set, an APZ function for automatic zooming based on the object distance is started. The APZ in the camera of the present embodiment is a servo type APZ in which brightness measuring, distance measuring and zooming operations are repeated while the switch Sl is ON. A switch S2 is turned ON when the shutter release button is pressed to the second stroke, to start shutter releasing operation. A switch SZI is a power zoom switch to a longer focal length side (hereinafter referred to as tele side). While the switch SZI is ON or until the long focal length end (hereinafter referred to as a tele end) is reached, power zooming is continued by the zoom motor. A switch SZO is a power zoom switch to a shorter focal length side (hereinafter referred to as wide side). While the switch SZO is ON or the short focal length end (hereinafter referred to as a wide end) is reached, power zooming is continued by the zoom motor. A switch SSLF is a self timer photographing mode (hereinafter referred to as a self mode) setting switch, for setting/canceling self mode every time it is switched ON. A switch SAPZ is an APZ mode setting switch for setting/canceling the APZ mode every time it is turned ON. A switch SFL is a flash mode changing switch. Any flash mode can be selected from three or more modes including a pre emission mode. Every time the switch SFL is turned on, setting of the mode is changed in cyclic manner. The switches SSLF, SAPZ and SFL are push switches formed of rubber whose positions and shapes are determined to be rather hard to press, so as to prevent erroneous turning ON of these switches. A switch SREW is a film rewind starting switch, and when it is turned ON, rewinding of the film is started. A switch SEND is a film end detecting switch. This switch is turned ON when film end is reached at winding of the film. In response, automatic rewinding of the film is started. A switch SWIND is a film winding switch which generates ON/OFF pulses by means of a following sprocket, not shown, which rotates corresponding to movement of the film. By counting the number of pulses during winding or rewinding, amount of wound film or rewound film can be detected. When the number of pulses generated in a prescribed time period is not a predetermined number, it can be regarded as an accident. A switch SFILM is a film detection switch, for detecting whether or not there is a film. This switch is ON when there is no film, and it is OFF when there is a film. A switch SCHECK is a check mode (an adjustment program contained in the control program) using switch. This switch is provided at a position preventing erroneous operation thereof by an ordinarily user of the camera.

Figure 2:
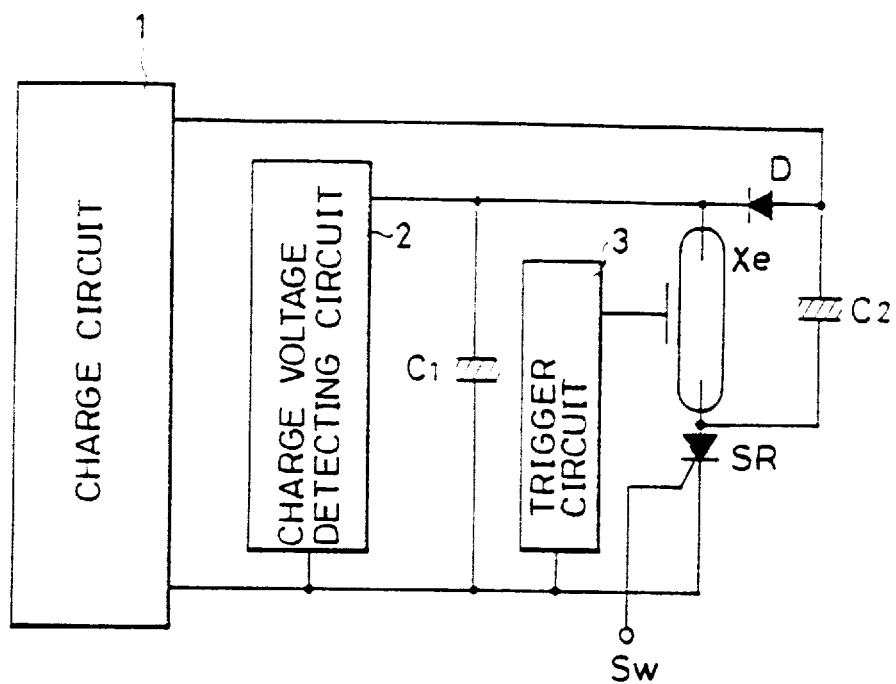
FIG. 2 is a schematic diagram showing a flash circuit.

FIG. 2 is a diagram of a flash circuit of the camera in accordance with the present invention. A function enabling pre emission prior to main emission of flash light is incorporated, so as to suppress a so-called redeye phenomenon (which tends to occur when photographing operation with flash light is done with low brightness).

In the figure, the reference character C1 denotes a main capacitor for main emission, C2 denotes a sub capacitor for pre emission, Xe denotes a lamp, SR denotes a thyristor, Sw denotes a terminal for controlling the thyristor SR, D denotes a diode, 1 denotes a charging circuit for charging the main capacitor C1 and sub capacitor C2, 2 denotes a charge voltage detecting circuit for detecting charging voltage of the main capacitor C1, and 3 denotes a trigger circuit for activating the lamp Xe for emission of light.

For charging both the main capacitor C1 and the sub capacitor C2, the thyristor SR is turned ON by turning on the switch SW. Consequently, the sub capacitor C2 is charged. When charging is not carried out, the thyristor SR is kept OFF.

When pre emission is to be given, the thyristor SR is turned off, so as to prevent formation of a discharging path of the main capacitor C1. When emission of light by the lamp Xe is activated by the trigger circuit in this state, discharging from only the sub capacitor C2 to the lamp Xe is carried out, enabling pre emission. Thereafter, the thyristor SR is turned on to form a discharging path of the main capacitor C1. At this time, movement of charges from the main capacitor C1 to the sub capacitor C2 is prevented by the diode D. Therefore, even if the thyristor SR is turned ON after the pre emission, charge voltage of the main capacitor C1 is not lowered. When emission of light by the lamp Xe is activated the trigger circuit to the lamp Xe, discharge from the main capacitor C1 having charges left therein to the lamp Xe is carried out, enabling main emission.

When main emission is to be done without pre emission, the thyristor SR is turned on from the start to form the discharging path of the main capacitor C1. When emission of light by the lamp Xe is activated by the trigger circuit, discharging from both the main capacitor C1 and sub capacitor C2 to the lamp Xe is carried out, enabling main emission.

Since the amount of charges to be discharged changes dependent on whether the pre emission is done or not, by the capacity of the sub capacitor C2, the guide number of the flash is different.

Figure 3A:
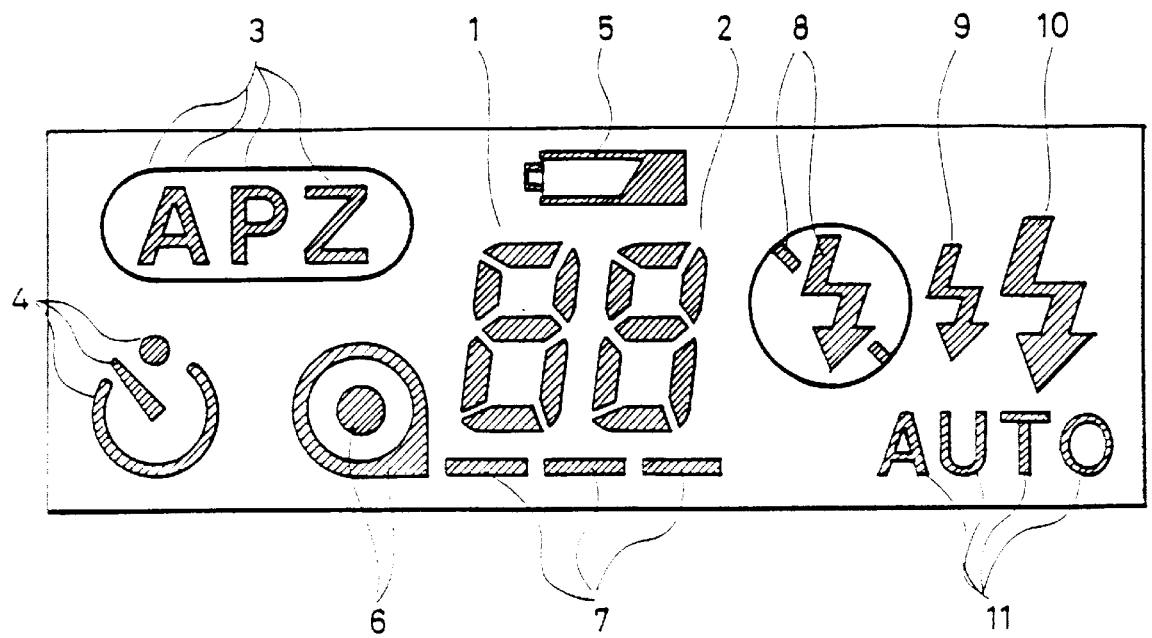
FIGS. 3A and 3B are schematic views illustrating the LCDs.
Figure 3B:
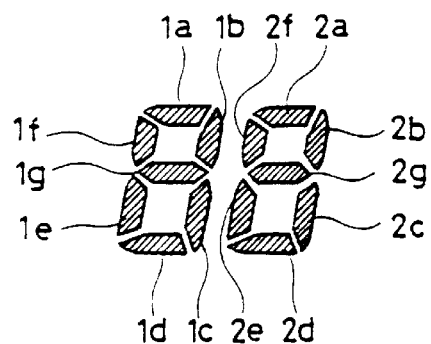

FIGS. 3A and 3B are illustrations of the LCD of the camera in accordance with the present invention. The reference numerals 1 and 2 denote film counters capable of displaying a number of two digits. As shown in FIG. 3B, respective digits have seven segments 1*a* to 1*g* and 2*a* to 2*g*. The reference numeral 3 denotes an APZ mark, which is lit when the APZ mode is set. The reference numeral 4 denotes a self mark which is lit when the self mode is set. The reference numeral 5 denotes a battery mark, which is flickered for giving a warning when the battery is being exhausted. Reference numeral 6 denotes a film cartridge mark and 7 denotes a film mark. These are lit when a film has been loaded. The reference numerals 8 to 11 are marks relating to the flash mode. The reference numeral 8 denotes an emission prohibition mark, which is lit when emission prohibiting mode is set. The reference numeral 9 is a pre emission mode mark, which is lit when the pre emission mode is set. The reference numeral 10 denotes a flash mark, which is lit when an automatic emission mode or a forced emission mode is set. The reference numeral 11 denotes an automatic emission mark, which is lit when the automatic emission mode is set.

<Description of the Control Program>

Figure 4A:
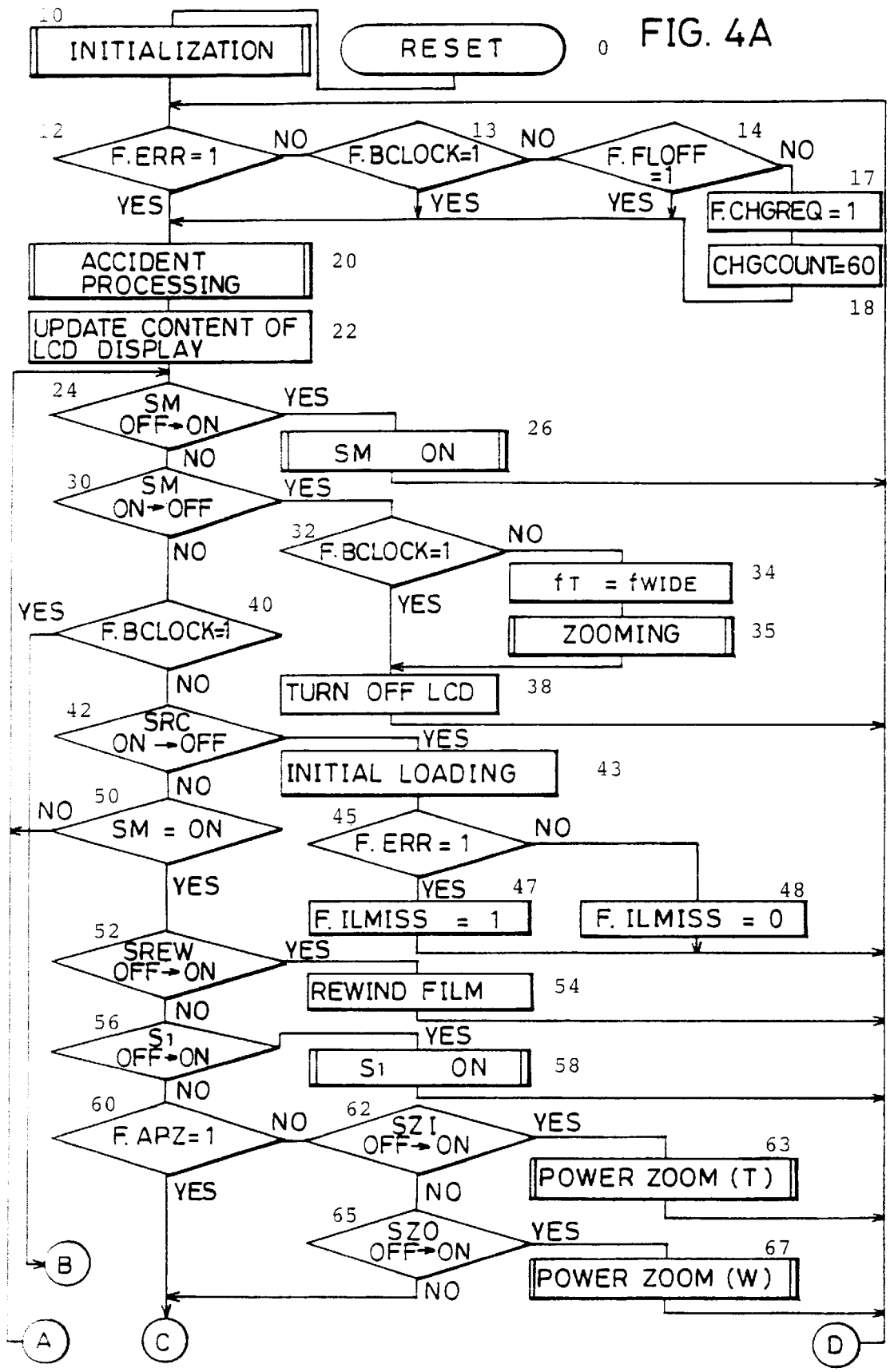
FIGS. 4A and 4B are flow charts showing the content of the control program.
Figure 4B:
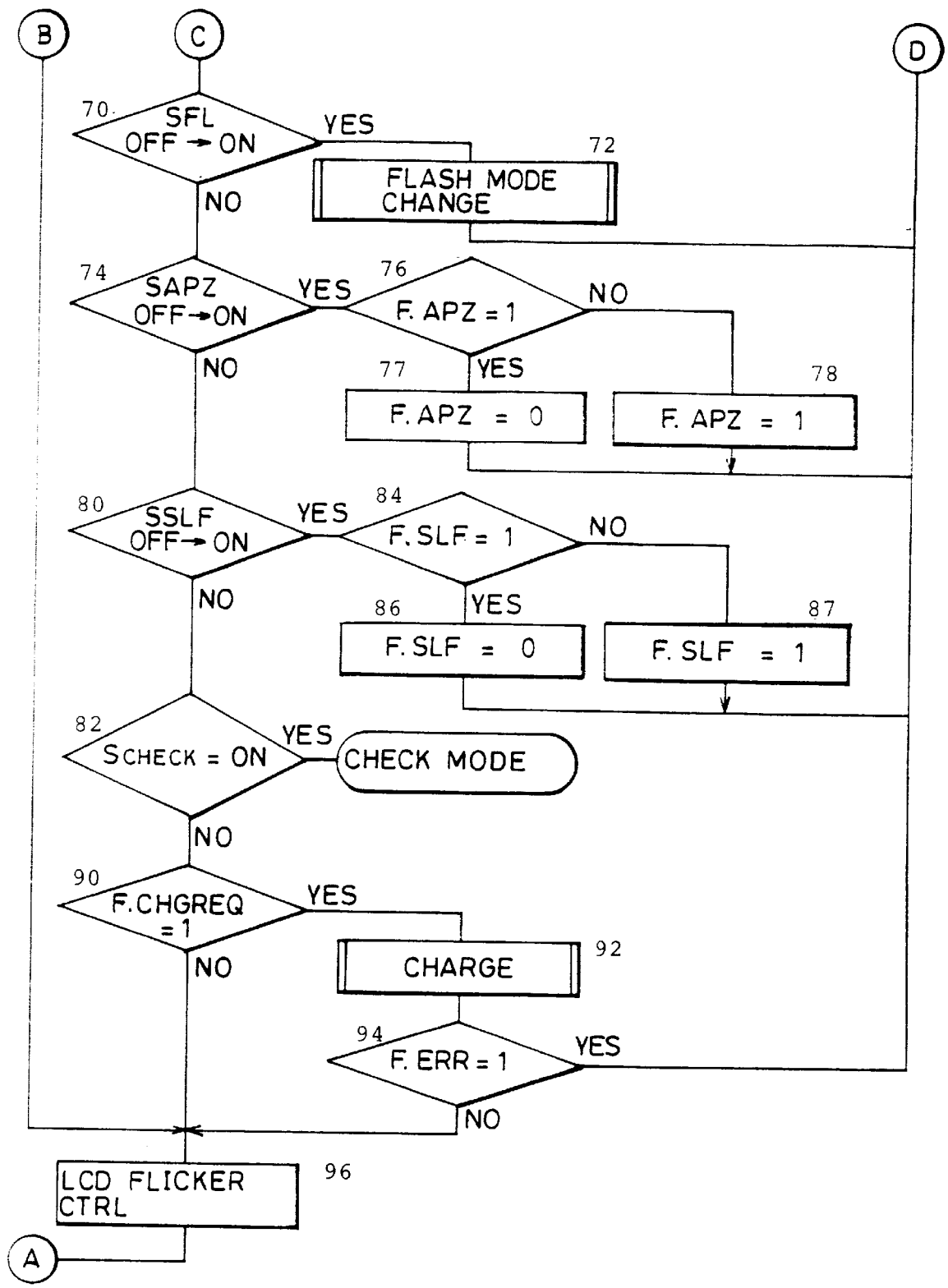

FIGS. 4A and 4B are flow charts of a control program of the microcomputer 1. The flow of the control program as a whole will be described with reference to the flow charts. The sub routines will be described later.

In the following description, a hexadecimal number is denoted by allotting $ at the left side. For example, B8 in hexadecimal notation is represented as $B8. The microcomputer includes an accumulator a. The data length of a is 8 bits, and each bit an (n=0 to 7) can be referred to.

When the battery is loaded, the control program starts with resetting (#0). First, a sub routine [initialization] is called (#10).

Thereafter, whether or not charging is necessary is determined. In case of an accident (accident flag F. ERR=1) (#12), when BC signal shows low voltage to prevent photographing operation (prevention flag F. BCLOCK=1) (#13), and when flash emission prohibiting mode is set (flash emission prohibition flag F. FLOFF=1) (#14), charging should be prevented, so that the flow directly proceeds to #20. Otherwise, the flow proceeds to #17 for setting flags and the like for charging. A charge request flag F. CHGREQ is set to 1 (#17), and 60 is input to a charge number counter CHGCOUNT (#18). Charging of the camera in accordance with the present invention is an intermittent type charging, in which charging for 250 ms is intermittently repeated until the battery is fully charged. However, in order to prevent the current from continuously flowing to the charging circuit due to a trouble in a charge voltage detecting circuit or the like, the maximum number of repetition is limited. The number 60 input to CHGCOUNT corresponds to 15 sec (=250 ms×60).

In #20, a sub routine [accident processing] is called, so as to cope with an accident.

In #22, the content of LCD is updated based on the latest photographing information.

In #24, a change of the switch SM is checked. When the switch SM has changed from OFF to ON, the sub routine [SM ON] is called (#26), and the flow returns to #12.

In #30, the change of the switch SM is checked. When the switch SM has changed from ON to OFF, the flow proceeds to #32. At this time, the zoom lens is reset to the wide end. However, when the BC signal represents low voltage, this operation is not carried out. In #32, the value of the BCLOCK is checked, and if BC signal represents low voltage (F. BCLOCK=1), the program directly proceeds to #38. Otherwise, a wide end focal length value fWIDE is input to a target focal length Ft (#34), and a sub routine [zooming] is called (#35). In either case, the LCD display is turned off (#38), and the flow returns to #12.

In #40, the value of the flag F. BCLOCK is checked. If the voltage of the battery is low (F. BCLOCK=1), the flow proceeds to #96 so as not to accept turning ON of the switches other than the switch SM.

In #42, the change of the switch SRC is checked. If the switch SRC has been changed from ON to OFF, it means that the back lid of the camera is closed. Therefore, a known initial loading operation of the film is started (#43). If the initial loading was not successfully finished (F. ERR=1) (#45), an initial load miss flag F. ILMISS is set to 1 (#47). If an accident occurs during the initial loading, the flag F. ERR is set to 1 and $10 is input to the ERRCODE. If the initial loading is successfully completed, the flag F. ILMISS is cleared to 0 (#48), and in either case, the flow returns to #12. In most cases, an accident during initial loading is caused by a mistake such as miss setting of the film before closing the back lid, and therefore such accident can not be immediately determined as a malfunction of the camera. Such accident may occur due to malfunction of a film feeding system. However, in that case, accident also occurs during film winding. Therefore, the malfunction can be confirmed at that time. The flag F. ILMISS is used to distinguish the initial loading miss from other malfunctions.

In #50, the state of the switch SM is checked. If the switch SM is not ON, the flow returns to #24 so as not to accept operations by the switches other than the switches SM and SRC.

In #52, the change of the switch SREW is checked. If the switch SREW has been changed from OFF to ON, a known film rewinding operation is started (#54), and the flow returns to #12. If an accident occurs during rewinding of the film, the flag F. ERR is set to 1, and $20 is input to the ERRCODE.

In #56, the change of the switch S1 is checked. When the switch S1 is turned from OFF to ON, the sub routine [S1 ON] is called (#58), and then the flow returns to #12.

In #60, the value of the APZ mode flag F. APZ is checked. This is to prohibit power zooming when the APZ mode is set. If the APZ mode is set (F. APZ=1), the program directly proceeds to #70. Otherwise, the flow proceeds to #62. In #62, the change of the switch SZI is checked. If the switch SZI has been changed from OFF to ON, a sub routine [power zoom (T)] is called (#63), and the flow returns to #12. In #65, the change of the switch SZ0 is checked. If the switch SZO has been changed from OFF to ON, a sub routine [power zoom (W)] is called (#67), and the program returns to #12.

In #70, the change of the switch SFL is checked. When the switch SFL is changed from OFF to ON, a sub routine [flash mode change] is called (#72), and the program returns to #12.

In #74, the change of the switch SAPZ is checked. When the switch SAPZ is changed from OFF to ON, setting/ releasing of the APZ mode is carried out. In #76, the value of the flag FAPZ is checked. If the APZ mode is set at present (F. APZ=1), the flag F. APZ is cleared to 0 (#77). Otherwise, the flag F. APZ is set to 1 (#78). In either case, the program then returns to #12.

In #80, the change of the switch SSLF is checked. When the switch SSLF is changed from OFF to ON, the value of the self mode flag F. SLF is checked (#84) so as to set/cancel the self mode. If the self mode is set at present (F. SLF=1), the flag F. SLF is cleared to 0 (#86). Otherwise, the flag F. SLF is set to 1 (#87). In either case, the program returns to #12.

In #82, the state of the switch SCHECK is checked. If it is ON, the control is changed to a check mode, which will be described later. If the switch SCHECK is OFF, the value of the flag F. CHGREQ is checked in #90 so as to determine whether charging is necessary or not. If charging is necessary (F. CHGREQ=1), a sub routine [Charge] is called for charging intermittently (#92). In #94, the value of the flag F. ERR is checked. If there is an accident during charging (F. ERR=1), the flow returns to #12. Otherwise, the flow proceeds to #96.

In #96, flickering operation is carried out for various marks of the LCD which are set to be flickered. More specifically, those marks which have been lit are turned off, and those marks which have been off are lit for every lapse of 250 ms so as to realize flickering. Then the program returns to #24.

[Initialization]

Figure 5:
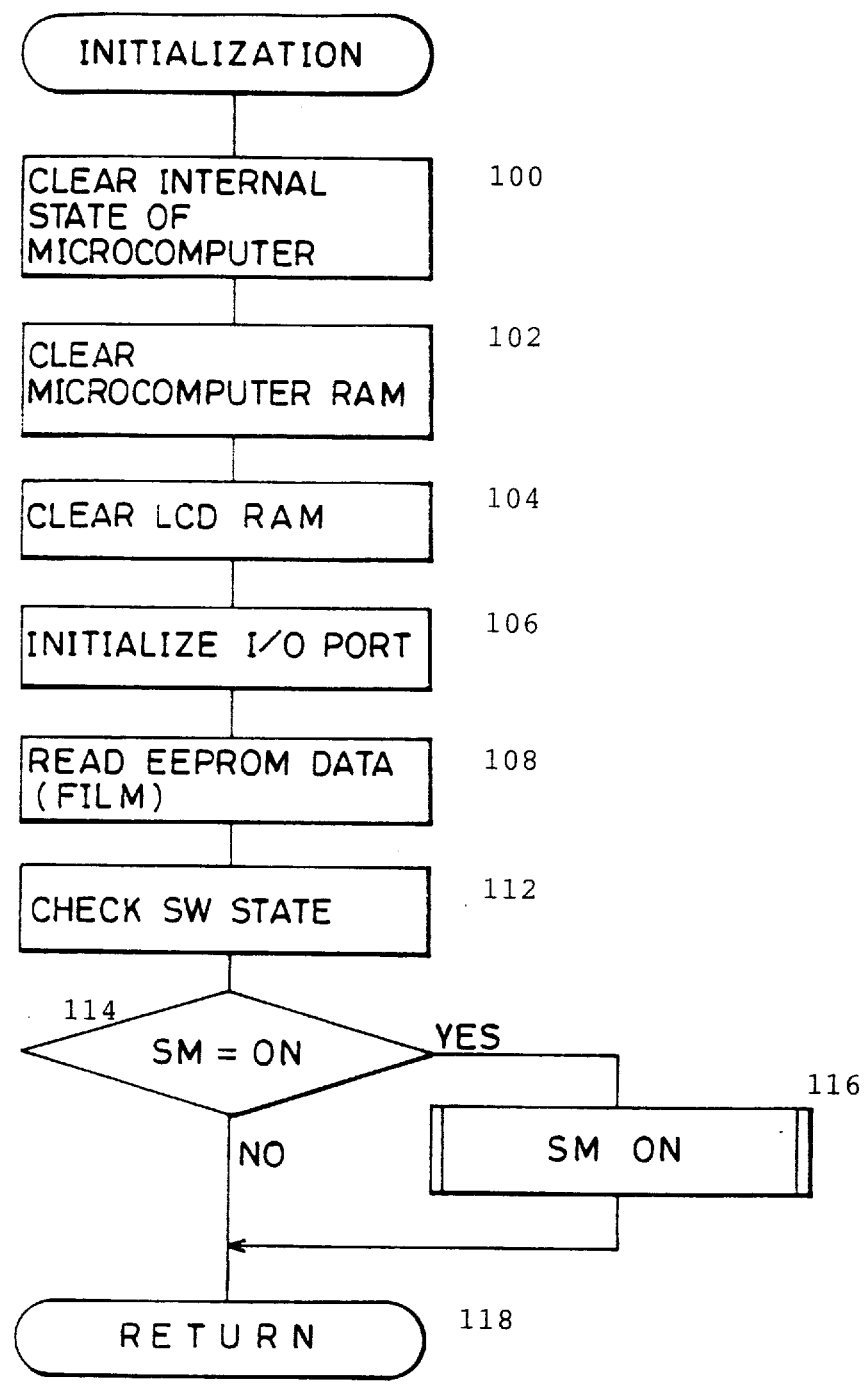
FIG. 5 is a flow chart showing a sub routine [Initialization].

In this sub routine, initialization is carried out. The process of the sub routine will be described with reference to FIG. 5.

In #100, the internal states of the microcomputer are cleared, and in #102, RAM in the microcomputer is cleared. In #104, the RAM for LCD is cleared, and in #106, input/output ports are initialized.

In #108, the value of a film counter stored in the EEPROM is read. With reference to #108, the notation (FILM) shows that the object to be processed is FILM. In this case, it means that the value of the FILM is read from the EEPROM. The object of processing will be referred to in the similar manner in the following.

In the camera of the present embodiment, the value of the film counter is stored in the EEPROM. Therefore, even if a battery is detached, the value of the film counter is maintained.

In #112, states of various switches of the camera are checked.

In #114, the state of the switch SM is checked. If the switch SM is ON, the subroutine [SM ON] is called (#116), and the program proceeds to #118. This is to enable photographing operation even when the battery is loaded with the switch SM being ON. If the switch SM is not ON, the program directly proceeds to #118. The program returns from #118 to the main routine.

[Accident Processing]

Figure 6:
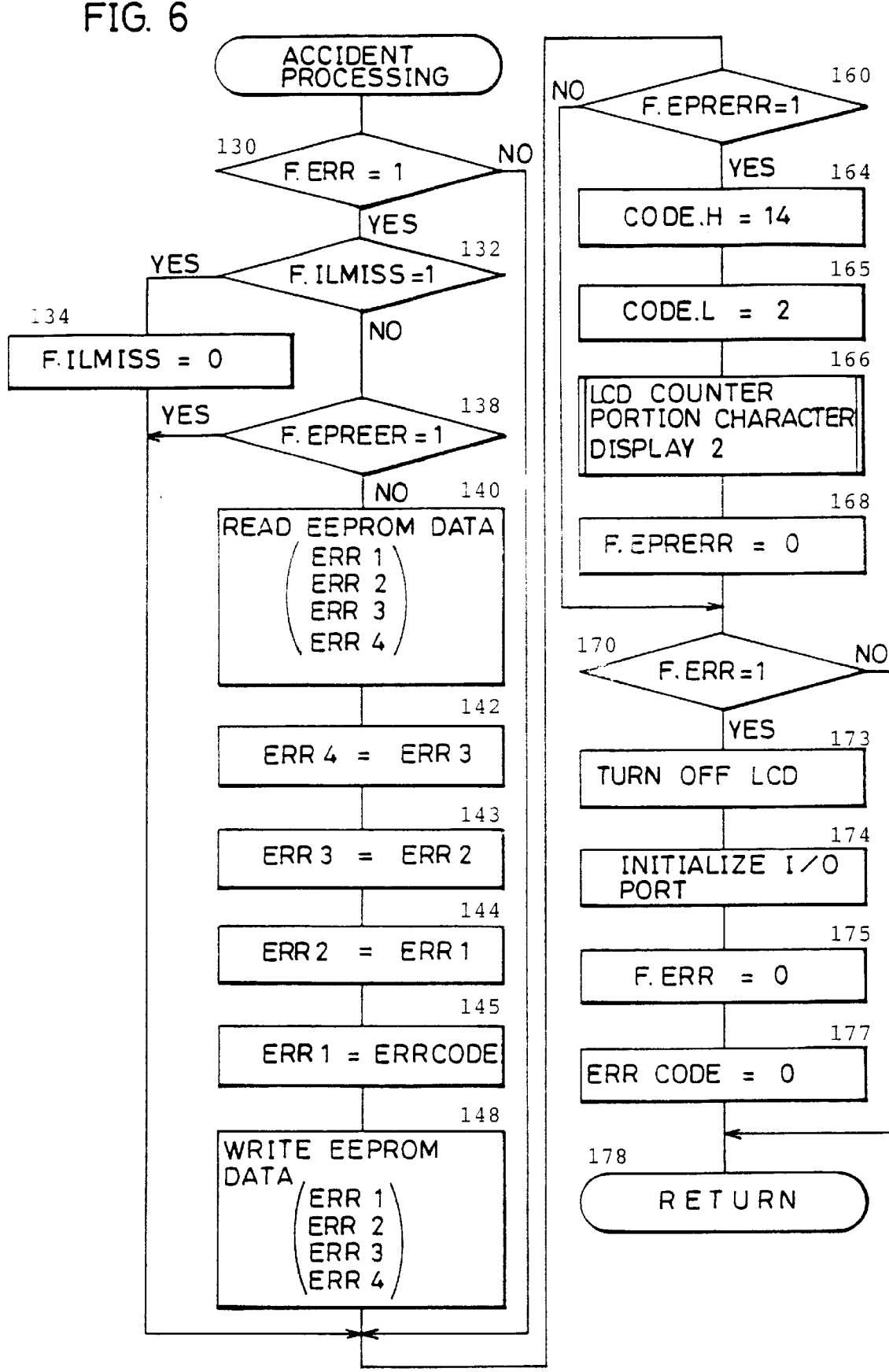
FIG. 6 is a flow chart showing a sub routine [Accident Processing].

This sub routine is for processing in case of accident. The processing of the sub routine will be described with reference to FIG. 6.

In #130, the value of the flag F. ERR is checked to determine whether or not there have been an accident. If any (F. ERR=1), the program proceeds to #132. Otherwise, the program proceeds to #160.

In #132, the value of the flag F. ILMISS is checked so as to determined whether the accident have occurred during initial loading or not. If the accident have occurred during initial loading (F. ILMISS=1), it is determined that the accident was derived from an operation miss, so that the flag F. ILMISS is cleared to 0 (#134), and the program proceeds to #160. If the accident have occurred not during the initial loading, the value of the EEPROM write accident generation flag F. EPRERR is checked (#138). IF the EEPROM write accident have occurred (F. EPRERR=1), it is impossible to write and store an error code to the EEPROM, and therefore the program proceeds to #160. Otherwise, it means that the camera is out of order, but the storing of the error code is possible. Then the program proceeds to #140 for time sequentially storing a plurality of error codes indicating the portions of accident.

In #140, four error codes (ERR1, ERR2, ERR3, ERR4) are read from the EEPROM. The portion of accident stored in ERR1 is the latest one. The accident stored in ERR2 is the second latest, ERR3 is the third latest, and ERR4 is the fourth latest. Therefore, what accidents have occurred in what order can be known for the last four accidents.

In #142, the value of ERR4 is replaced by the newer value of ERR3. Similarly, the value of ERR3 is replaced by the value of ERR2 (#143), the value of ERR2 is replaced by the value of ERR1 (#144), and the value of ERR1 is replaced by the value of the error code ERRCODE indicating the new portion of accident (#145). By these processes, the values ERR1, ERR2, ERR3 and ERR4 are always updated to the latest four error codes at present. In #148, the updated four error codes (ERR1, ERR2, ERR3, ERR4) are written to the EEPROM.

In #160, the value of the flag F. EPRERR is checked. If there is a write accident in the EEPROM (F. EPRERR=1), the program proceeds to #164. Otherwise, the program proceeds to #170.

When a EEPROM write accident occurs, the flag F. ERR is not set to 1, as will be described later. The reason for this is as follows. Namely, by treating the EEPROM write accident independently from other accidents, this write accident and other accidents can be detected, even if other accidents occur simultaneously. Further, if there is an EEPROM write accident, storing of the information of malfunction itself is impossible.

In #164, 14 is input to the character code CODE H of higher significance (#164), 2 is input to the character code CODE L of lower significance (#165), and the sub routine [LCD counter portion character display 2] is called (#166). Consequently, the characters "E2" indicating the EEPROM write accident is displayed for about one second at the film counter portion of the LCD. Therefore, in case the writing of the error code to the EEPROM is unsuccessful due to an accident, storing of the error code is not carried out, but the display thereof is possible.

Then, in #168, the flag F. EPRERR is cleared to 0.

In #170, the value of the flag F. ERR is checked again, so as to determine whether or not there is an accident. If any (F. ERR=1), all LCD displays are turned off (#173), the input/output port of the microcomputer is initialized (#174), the flag F. ERR is cleared to 0 (#175), and the initial value 0 is input to the ERRCODE (#177). Therefore, if an accident occurs, the error code is stored, and then the LCD displays of the camera are turned off so as to inform the user of the trouble of the camera.

The program returns from the step #178 to the main routine.

[SM ON]

Figure 7:
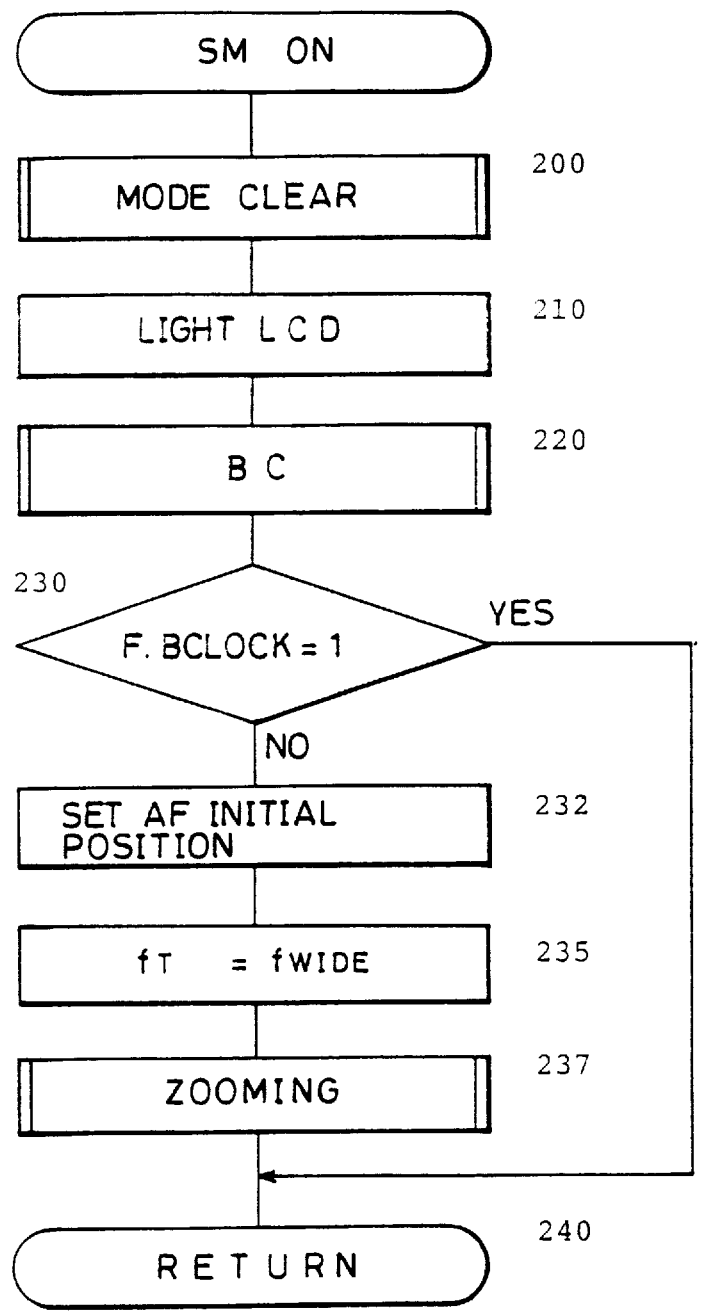
FIG. 7 is a flow chart showing a sub routine [SM ON].

This sub routine is for processing when the switch SM is changed from OFF to ON. The processing of this sub routine will be described with reference to FIG. 7.

A sub routine [mode clear] is called (#200) for initializing various photographing modes of the camera, and the LCD display are turned on (#210).

Thereafter, to effect battery check, the sub routine [BC] is called (#220). Then, the value of the flag F. BCLOCK is checked (#230). If the BC is locked (F. BCLOCK=1), the program directly proceeds to #240 so as to stop the following processes. If BC is not locked, a focusing lens for AF is set at an initial position (#232), a value fWIDE is input to fT (#235) so as to set the zoom at the wide end, and the sub routine [zooming] is called (#237). Then the program returns from #240 to the main routine.

[Mode clear]

Figure 8:
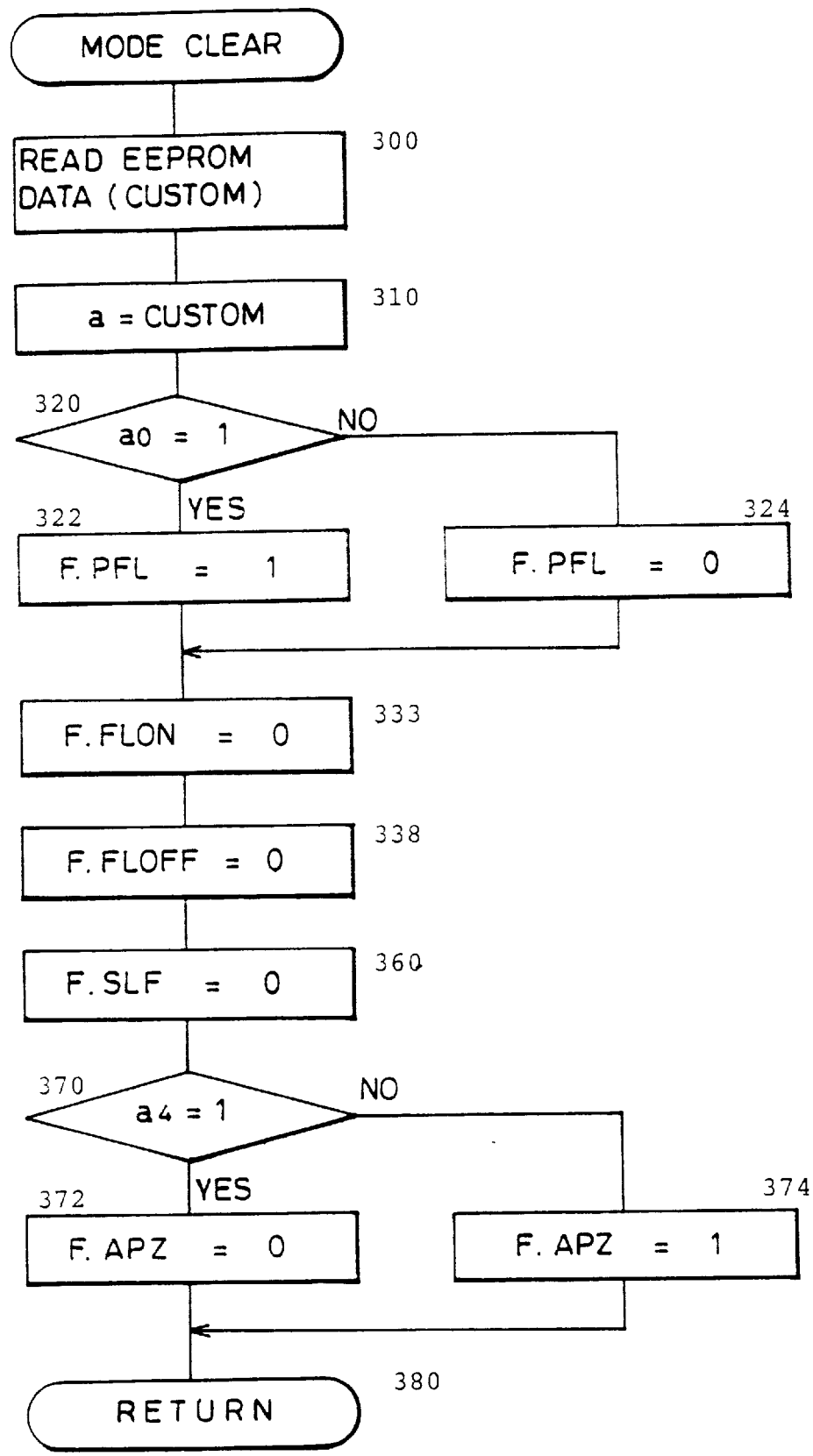
FIG. 8 is a flow chart showing a sub routine [Mode Clear].

This sub routine is to effect processings for initializing various photographing modes of the camera. The processings of this sub routine will be described with reference to FIG. 8.

In #300, initialization information CUSTOM such as various photographing modes of the camera are read from the EEPROM.

In #310, the value of CUSTOM is input to the accumulator a of the microcomputer.

In #320, the value of a0 (corresponding to the 0th bit of the initialization information CUSTOM). The value a0 determines whether the pre emission mode should be given priority to be set at the turning ON of the main switch. When a0 is 1, the pre emission permission flag F. PFL is set to 1 (#322) for setting the pre emission mode, and when A0 is 0, the flag F. PFL is cleared to 0 (#324) so as not to set the pre emission mode. By the value of the EEPROM, whether the pre emission is given priority for resetting or not can be determined. Cameras may be used in different manners for different objects in different countries or regions. Therefore, it is preferred to set the initial mode to realize the most suitable specification for the most popular use and object in that country in which the cameras are to be sold, in accordance with previous market research, so as to provide cameras useful and convenient for users in various countries.

The initial mode when the main switch is turned ON is the flash automatic emission mode. Therefore, the flash emission forcing flag F. FLON is cleared to 0 (#333), and the flag F. FLOFF is cleared to 0 (#338).

In #360, the flag F. SLF is cleared to 0 to cancel the self mode.

In #370, the value of a4 (corresponding to the 4th bit of CUSTOM) is checked. a4 determines whether or not the APZ mode is to be given priority to be set at the turning ON of the main switch. When a4 is 1, the flag F. APZ is cleared to 0 (#372) so as not to set the APZ mode, and when a4 is 0, the flag F. APZ is set to 1 (#374) to set the APZ mode. In this manner, by the value of the EEPROM, whether or not the APZ mode should be given priority to be set can be determined. Thereafter, the program returns from #380 to the main routine.

In this manner, how to initially set the various photographing mode can be easily changed dependent on the value of the EEPROM. Therefore, not all cameras must be fixedly set similarly. The setting of the cameras may be changed dependent on destination of shipment. When there are a plurality of types of cameras having different designs and different colors, the settings of the various modes can be changed dependent on such types. In addition, the setting may be changed at a service center or the like, so as to meet the demand of the users.

[BC]

Figure 9:
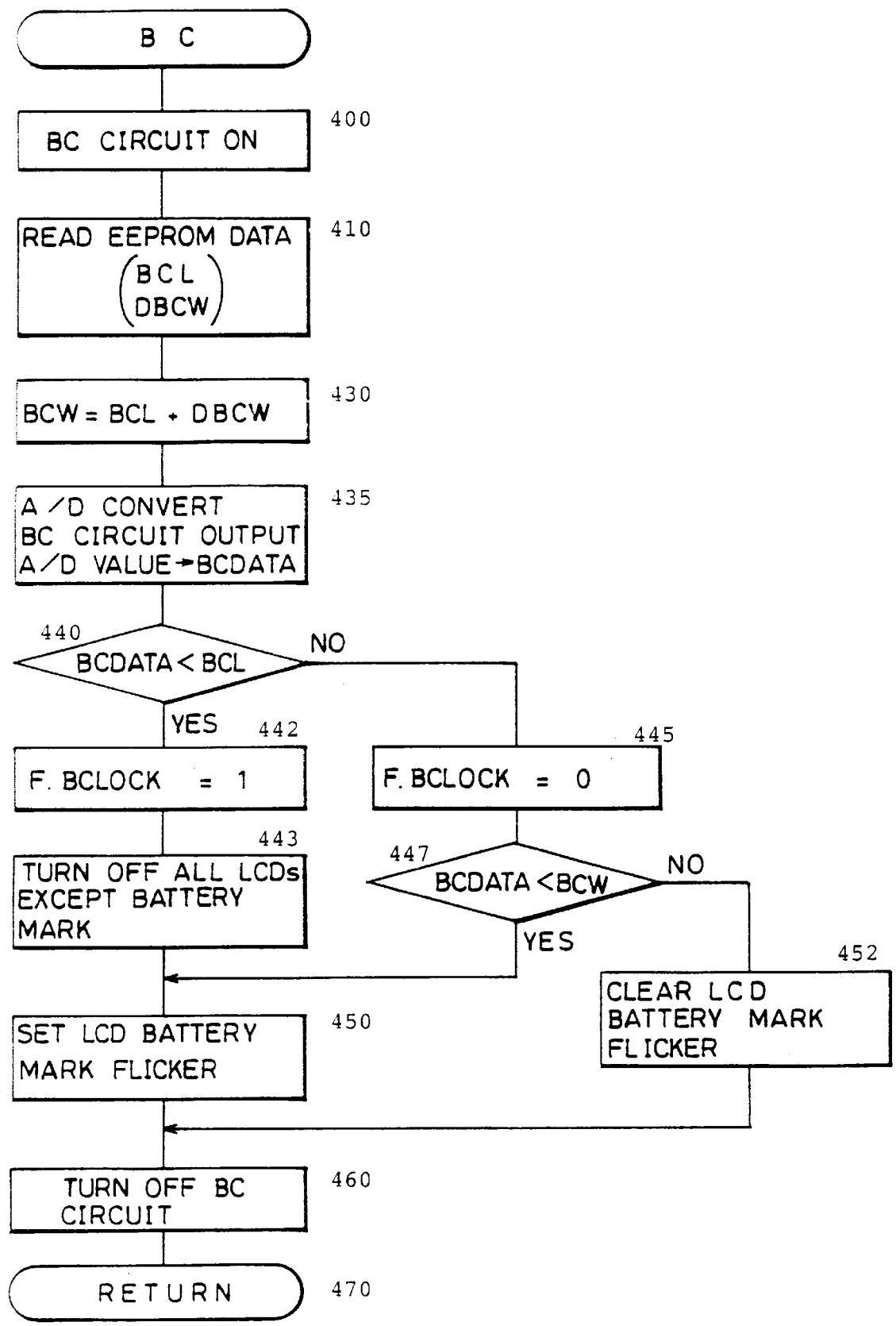
FIG. 9 is a flow chart showing a sub routine [BC].

In this sub routine, battery check is effected to know the remaining power of the battery. The processings of this routine will be described with reference to FIG. 9. In this embodiment, the remaining power of the battery is determined to be one of the following three stages. Namely, (1) BC lock: photographing operation is impossible, so that photographing operation is prohibited. At the LCD displaying portion, only the battery mark is flickered, and other displays are turned off. (2) BC alarm: the photographing operation can be carried out normally. However, in order to alarm the user of the fact that the battery is about to be exhausted, the battery mark of the LCD is flickered. Other displays are the same as the normal state. (3) normal: the power of the battery is sufficient.

In #400, the BC circuit is turned ON. Then adjusting data (BCL, DBCW) for BC are read from the EERPOM (#410). BCL provides the level for prohibiting photographing procedure, and DBCW provides difference between the prohibiting level BCL and the level for warning BCW, and therefore the value BCL+DBCW is input to BCW (#430).

In #435, A/D conversion of the output from the BC circuit is carried out, and the resulting A/D value is input to a BC circuit output data BCDATA.

In #440, magnitude of BCDATA and BCL is compared. If it is determined to be prohibition (BCDATA<BCL), the flag F. BCLOCK is set to 1 (#442), all LCD displays except the battery mark are turned off (#443), and the program proceeds to #450. If it is not the prohibition, the flag F. BCLOCK is cleared to 0 (#445), and the magnitude of BCDATA and BCW is compared (#447). If it is determined to be warning (BCDATA<BCW), the program proceeds to #450. Otherwise, it proceeds to #452. In #450, the battery mark of the LCD is set to be flickered. In #452, setting for flickering the battery mark of the LCD is cleared. In #460, the BC circuit is turned off, and the program returns from #470 to the main routine.

[Zooming]

Figure 10:
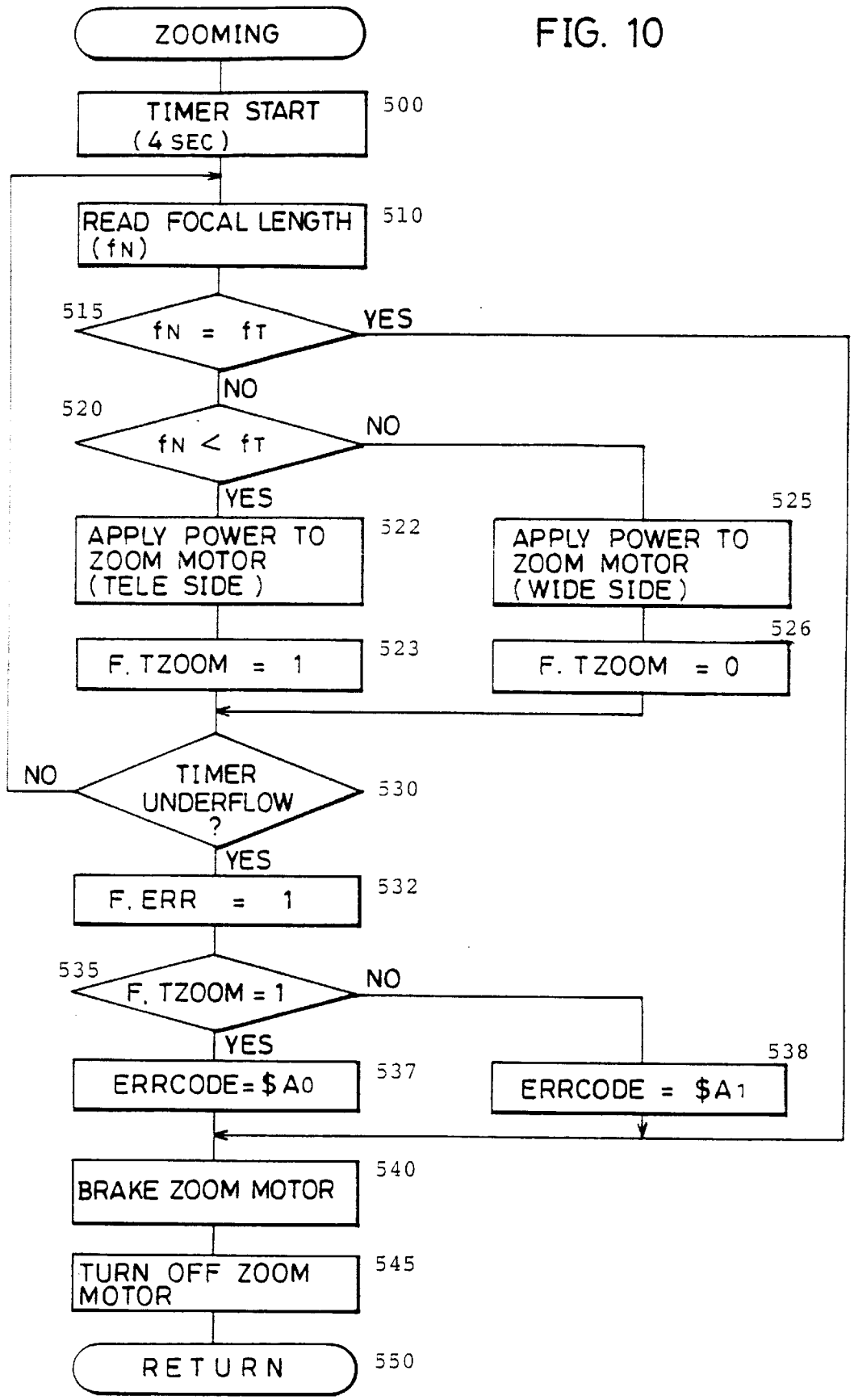
FIG. 10 is a flow chart showing a sub routine [Zooming].

This sub routine is to effect zooming to the target focal length provided as fT. The processings of the sub routine will be described with reference to FIG. 10.

In #500, the operation of a timer included in the microcomputer is started with the set time being 4 sec. This timer of the microcomputer is a decrementing type and an underflow occurs when the set time has lapsed. This timer is used to detect zooming not completed in a prescribed time period due to an accident or the like during zooming.

In #510, the present focal length is read and the value is input to present focal length fN.

In #515, fN and fT are compared. If it is determined that the target focal length has reached (fN=fT), the program proceeds to #540. Otherwise, it proceeds to #520.

In #520, the magnitude of fN and fT is compared. If it is determined that the lens position is on the wide side than the target focal length (fN<fT), power is applied to the zoom motor so as to effect zooming to the tele side (#522), and a tele side zooming flag F. TZOOM is set to 1 (#523). Otherwise, power is applied to the zoom motor so as to effect zooming to the wide side (#525), and the flag F. TZOOM is cleared to 0 (#526).

In #530, whether or not there is an underflow of the timer is checked. If the underflow has occurred, it is determined as a zoom accident, and the flow proceeds to #532. Otherwise the flow returns to #510.

In #532, the flag F. ERR is set to 1, the value of the flag F. TZOOM is checked (#535), and if it is determined that an accident have occurred during zooming to the teleside (F. TZOOM=1), $A0 is input to ERRCODE (#537). If it is determined that an accident have occurred during zooming to the wide side, $A1 is input to the ERRCODE (#538).

In #540, the zoom motor is braked to stop, and thereafter, the zoom motor is turned OFF (#545). Thereafter, the program returns from #550 to the main routine.

[S1 ON]

Figure 11:
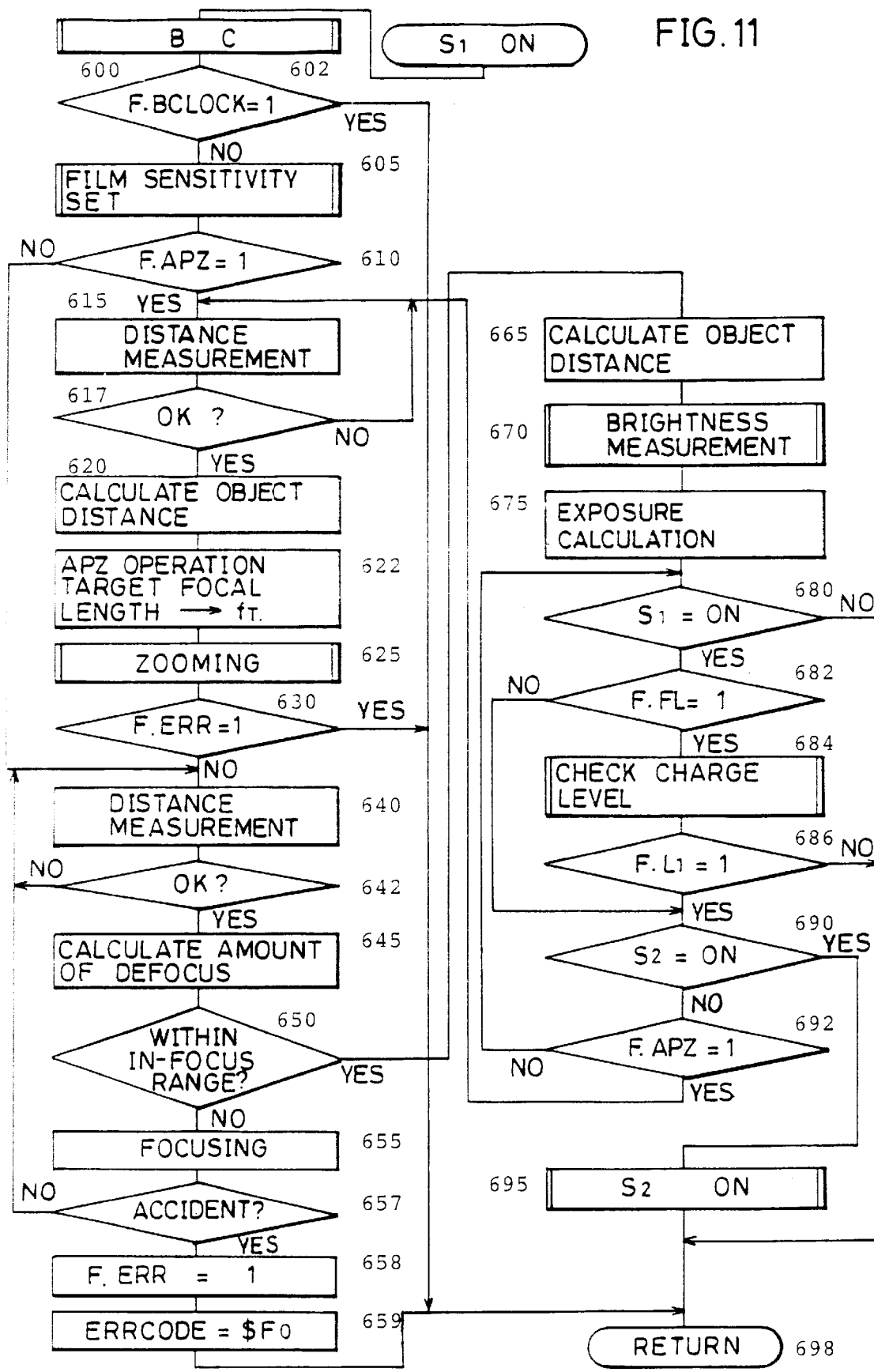
FIG. 11 is a flow chart showing a sub routine [S1 ON].

This sub routine is for processing when the switch S1 is changed from OFF to ON. This sub routine will be described with reference to FIG. 11.

In #600, the sub routine [BC] is called for BC. Then, the value of the flag F. BCLOCK is checked (#602). If the photographing is to be prohibited (F. BCLOCK=1), the program immediately proceeds to #698 so as to stop the following processes. If the photographing is not to be prohibited, a sub routine [film sensitivity setting] is called (#605) in order to set film sensitivity based on DX codes.

In #610, the value of the flag F. APZ is checked. If the APZ mode is set (F. APZ=1), the program proceeds to #615. Otherwise, it proceeds to #640.

In #615, known focus detection is effected by using the image pickup device, and thereafter whether or not focus detection was properly done is determined. If the focus detection was properly done (focus detection OK), the program proceeds to #620. Otherwise, the program returns to #615 and focus detection is repeated until it is properly effected.

In #620, object distance is calculated based on the data of focus detection.

In #622, APZ operation is carried out to determine the target focal length based on the object distance, and a result is input to fT. Thereafter, zooming to the target focal length position is effected (#625). In #630, the value of the flag F. ERR is checked, and if there has been an accident during zooming (F. ERR=1), the program proceeds to #698 so as to stop the following processes. Otherwise, the program proceeds to #640.

In #640, focus detection is carried out again, and thereafter, whether or not focus detection was properly done is determined. If the focus detection was done properly (focus detection OK), the program proceeds to #645. Otherwise, the program returns to #640 and focus detection is repeated until it is done properly.

In #645, the amount of defocus is calculated based on the focus detection data. Thereafter, the amount of defocus is compared with a prescribed range of in-focus (#650). If it is determined to be in-focus (the amount of defocus is in the prescribed range of in-focus), the program proceeds to #665. Otherwise, the program proceeds to #655.

In #655, focusing is carried out based on the amount of defocus. Thereafter, whether an accident have occurred during focusing or not is checked (#657). If an accident have occurred during focusing (F. ERR=1), the flag F. ERR is set to 1 (#658), $F0 is input to ERRCODE (#659), and the program proceeds to #698. If there is no accident occurred, the program returns to #640.

In #665, the object distance is calculated based on the focus detection data.

In #670, the sub routine [brightness measurement] is called for measuring brightness, and thereafter known exposure calculation is done (#675).

In #680, the state of the switch S1 is checked. If the switch S1 is kept ON, the program proceeds to #682. If the switch S1 is OFF, it is determined that the user has given up photographing operation, and the program proceeds to #698.

In #682, the value of the flash emission determination flag F. FL is checked. The flag F. FL is determined by the exposure calculation in step #675. This flag is set to 1 when photographing operation is to be done with flash light, and it is cleared to 0 when photographing operation is to be done with ambient light. When photographing operation is to be done with flash light (F. FL=1), the sub routine charge level check] is called so as to check the level of charging the capacitor of the flash circuit (#684). In #686, the value of the flag F. L1 is checked. If the charge level has reached the first level (F. L1=1), the program proceeds to #690. Otherwise, it means that the level of charging has not yet reached the first level and that light intensity of flash light is insufficient. Proper exposure at the photographing operation with flash light can not be ensured, so that the program proceeds to #698 so as to return to the main routine for additional charging.

In #690, the state of the switch S2 is checked. If the switch S2 is ON, the program proceeds to #695, and if the switch is OFF, the program proceeds to #692.

In #692, the value of the flag F. APZ is checked. If the APZ mode is set (F. APZ=1), the program returns to #615. Otherwise, the program returns to #680. More specifically, when the APZ mode is set, the APZ operation is repeated while the switch S1 is ON and S2 is OFF. If the APZ mode is not set, operations such as distance measurement and brightness measurement are not repeated, and the data are maintained as they are. Therefore, a so called AF. AE lock is effected.

In #695, the sub routine [S2 ON] is called to execute exposure operation.

Then the program returns from #698 to the main routine.

[Film Sensitivity Setting]

Figure 12:
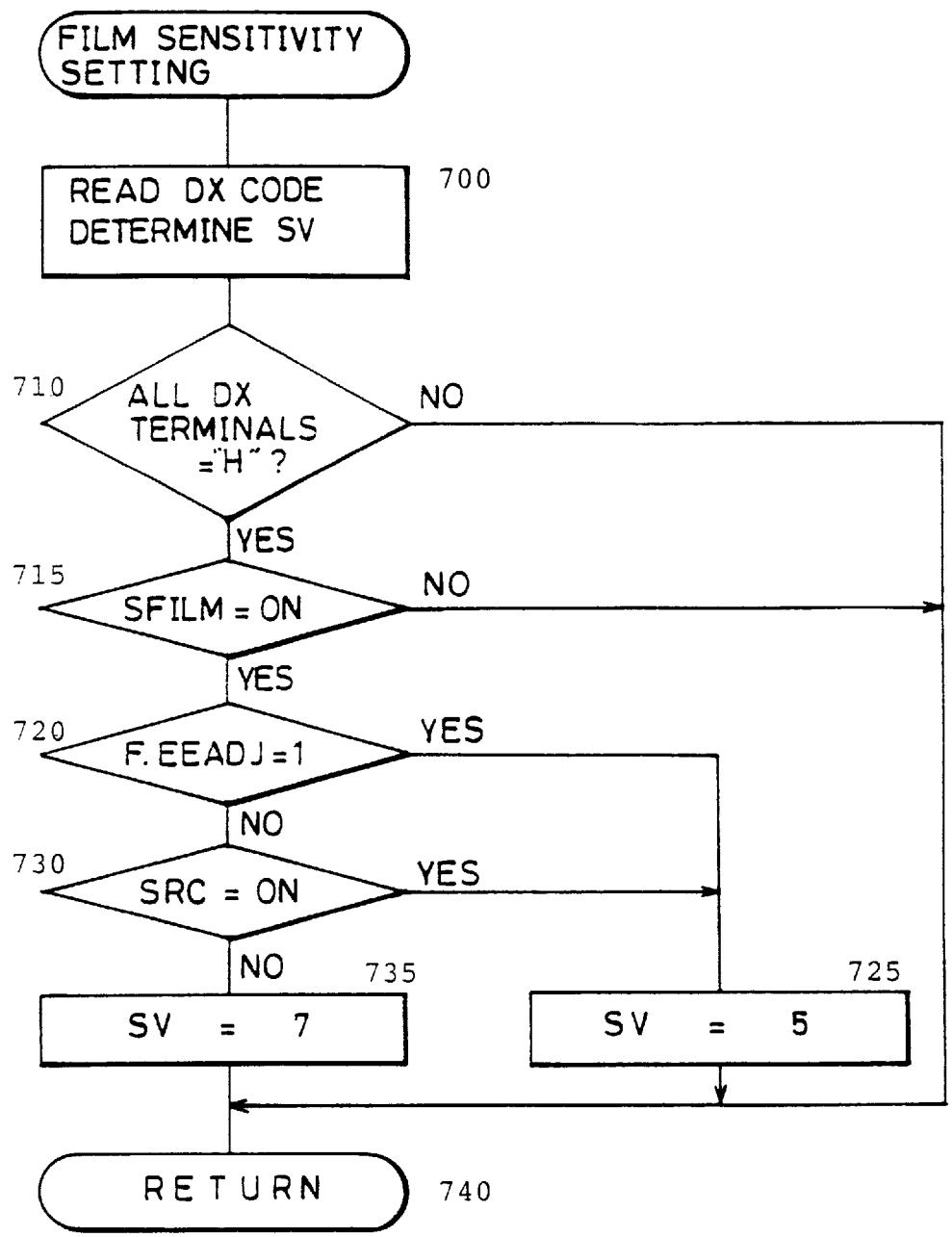
FIG. 12 is a flow chart showing a sub routine [Film Sensitivity Setting].

This sub routine is to set film sensitivity information based on the DX codes on the film cartridge. The sub routine will be described with reference to FIG. 12.

First, in #700, the DX code information is read by a known method, and an APEX value corresponding to the film sensitivity ISO is determined and input to variable SV. The camera of the present invention is a simple type having only three DX terminals and capable of reading stepwise ISO 25 (Sv3) to ISO 3200 (Sv10). When a film of ISO 25 is loaded and when no film is loaded, "H" level signals are input to all of the three DX terminals. Therefore, these two cases can not be discriminated from each other. Consequently, even when there is no film loaded, the ISO is set to 25.

In #710, when signals input to the DX terminals are all "H", the program proceeds to #715. Otherwise, the program proceeds to #740.

In #715, the state of the switch SFILM is checked. If there is no film (SFILM=ON), it is determined that no film is loaded, and the program proceeds to #720. Otherwise, it is determined that a film of ISO 25 is actually loaded, the value of SV is maintained, and the program proceeds to #740.

In #720, the value of the exposure adjustment flag F. EEADJ is checked. In this specification, the exposure adjustment means adjusting the exposure at manufacturing assembly. If it is determined that the exposure adjustment step is being carried out (F. EEADJ=1), the program proceeds to #725, and otherwise, the program proceeds to #730.

In #725, 5 is input to SV so as to set ISO to 100 which is considered to be optimal for exposure adjustment, and then the program proceeds to #740. The setting of ISO 100 is done by the following reason. Namely, luminance of a box called by "a lighting box having standard luminance", which emits light of reference luminance to be used for adjusting the exposure at assembly step, is represented by "a box luminance of which is obtained as Ev (when ISO is 100)", not "a box luminance of which is obtained as Bv". The setting of ISO 100 is for correspondence therewith.

When the sensitivity is set otherwise, additional calculation becomes necessary.

In #730, the state of the switch SRC is checked. If it is determined that the back lid is open (SRC=ON), the flow proceeds to #725. Otherwise, the program proceeds to #735.

In #735, 7 is input to SV so as to provide the setting of ISO 400. Then the flow proceeds to #740. When the back lid is closed without loading a film, it may mean that the camera is handled to no purpose. Setting of ISO not to 25 nor 100 but to 400 reduces frequency of automatic flash emission. Hence, consumption of battery can be reduced. This setting is preferred to prohibition of automatic emission when the film is not loaded. If the emission of flash is prohibited, the user of the camera may be anxious and he may wonder if the camera is out of order.

Then the program returns from #740 to the main routine.

[Brightness Measurement]

Figure 13:
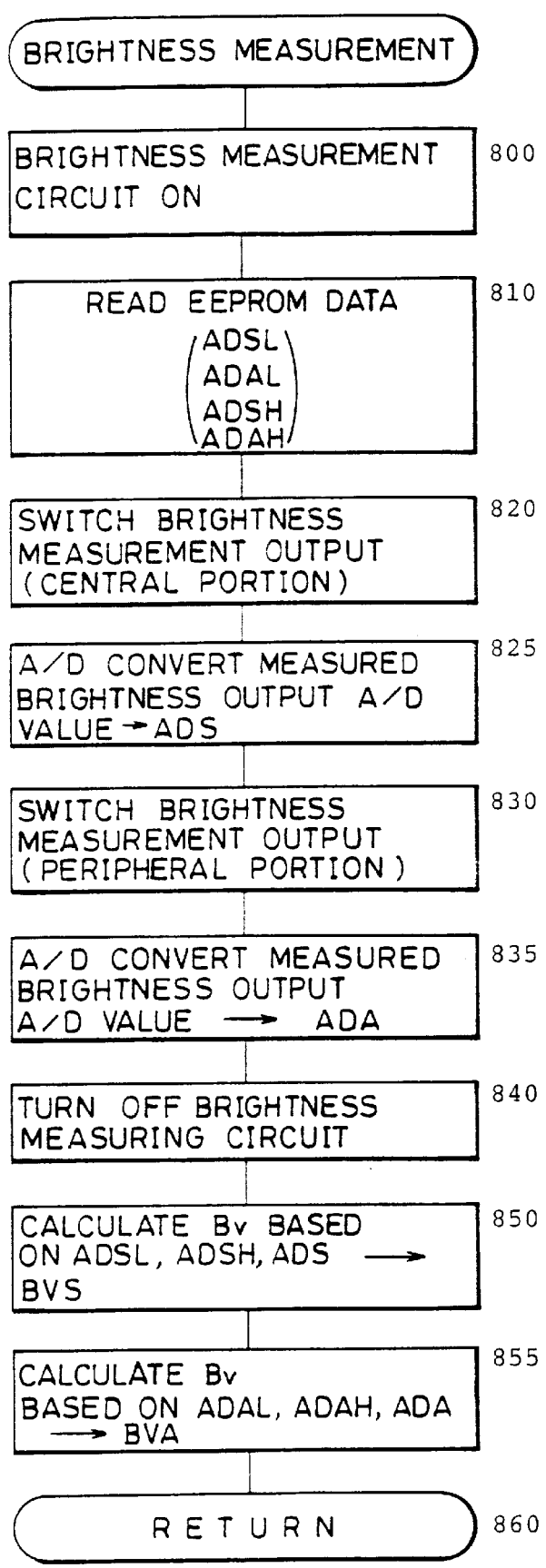
FIG. 13 is a flow chart showing a sub routine [Brightness Measurement].

The sub routine is for processing for measuring brightness at the central portion and at the peripheral portion of the photographing field, based on outputs from brightness measuring circuit. The processings of the sub routine will be described with reference to FIG. 13.

In #800, a brightness measuring circuit is turned ON, then adjustment data (ADSL, ADAL, ADSH, ADAH) for brightness measurement are read from the EEPROM (#810). ADSL and ADAL are A/D converted values of the outputs from the brightness measuring circuit when adjustment for brightness measurement is done with Ev7. ADSL corresponds to the value at the central portion, and ADAL corresponds to the value of the peripheral portion. ADSH and ADAH are A/D converted values of the outputs from the brightness measuring circuit when adjustment for brightness measurement is done with Ev being 15. ADSH corresponds to the central portion, and ADAH corresponds to the peripheral portion.

In #820, the output from the brightness measuring circuit is switched to an output corresponding to the brightness at the central portion. The output from the brightness measuring circuit is A/D converted, and the resulting A/D value is input to a central brightness measuring circuit output data ADS (#825).

Thereafter, the output of the brightness measuring circuit is switched to an output corresponding to the brightness at the peripheral portion. The output from the brightness measuring circuit is A/D converted, and the resulting A/D value is input to the peripheral portion brightness measuring circuit output data ADA (#835).

In #840, the brightness measuring circuit is turned OFF.

Figure 14:
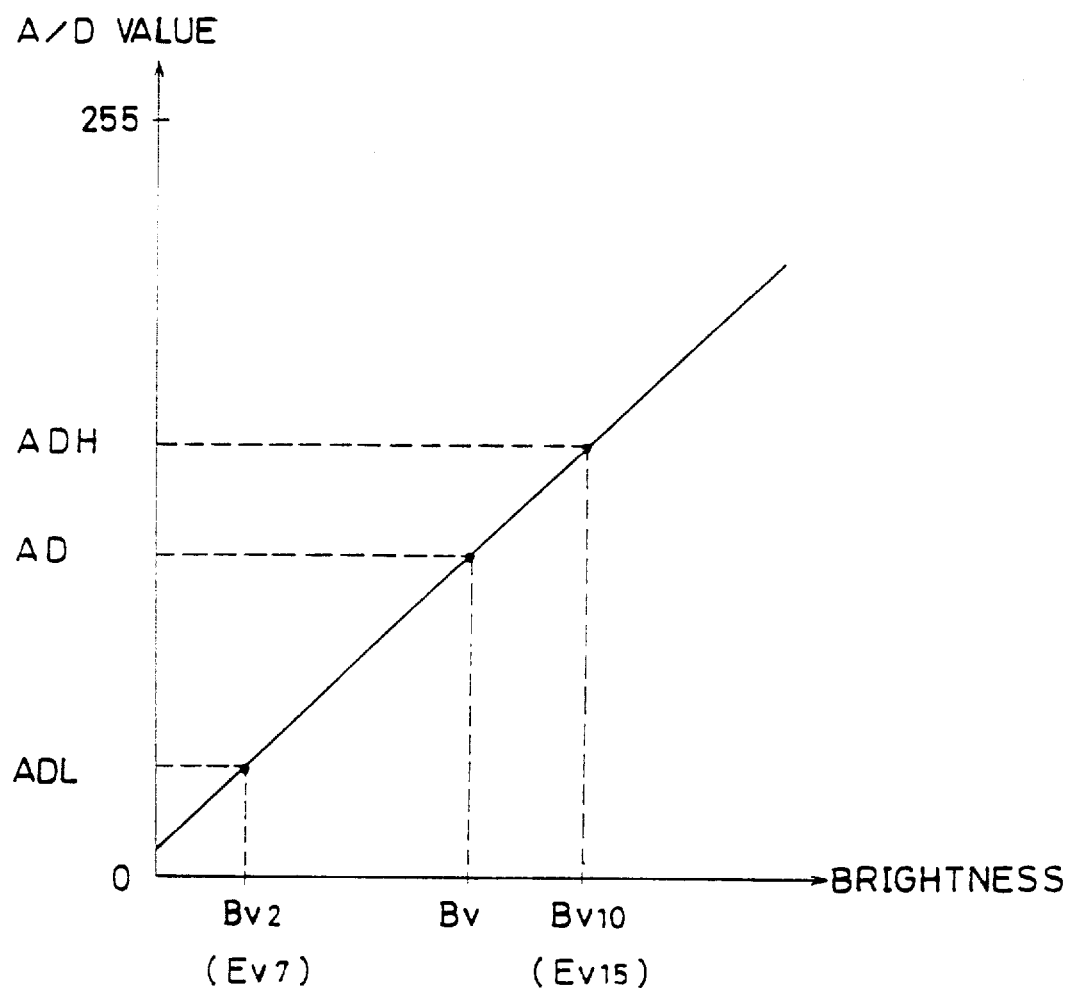
FIG. 14 shows relation between the field Bv and brightness measuring circuit output A/D value.

In #850, the Bv of the central brightness is calculated based on the adjustment data (ADSL, ADSH) corresponding to the central brightness and on the brightness measuring circuit output data ADS, and the calculated value is input to the central Bv BVS. In the brightness measuring circuit of the present embodiment, the relation between the field Bv and the brightness measuring circuit output A/D value is linear, as shown in FIG. 14. In the figure, the adjustment data at Ev7 is represented by ADL, the adjustment data at Ev15 is represented by ADH, and the brightness measuring circuit output data corresponding to the field brightness is represented by AD. Since the A/D values at Bv2 (Ev7 with ISO 100) and at Bv10 (Ev15 at ISO 100) are provided by the adjustment data (ADL, ADH), one line can be determined. Therefore, the Bv of the photographing field can be calculated based on the value AD.

Similarly, in #855, the Bv of the peripheral brightness is calculated based on the adjustment data (ADAL, ADAH) corresponding to the peripheral brightness and on the brightness measuring circuit output data ADA, and the calculated value is input to the peripheral Bv BVA.

The program returns from #860 to the main routine.

[Charge Level Check]

Figure 15:
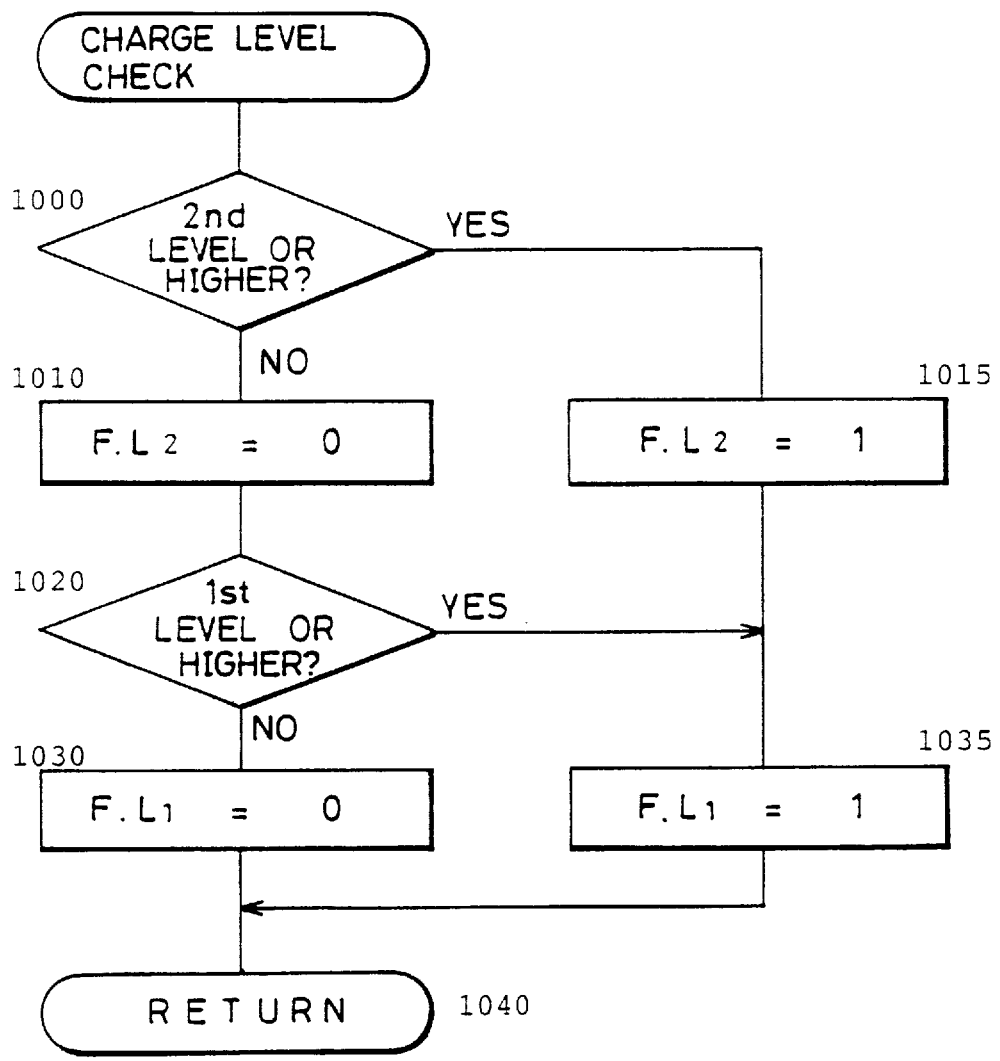
FIG. 15 is a flow chart of a sub routine [Charge Level Check].

This sub routine is to check the charge level of the capacitor for flash emission. The flash circuit of the present embodiment has two charge detection levels. The first level is photographing with flash light possible level, and the second level is charge stop level. The second level is about 300 V, and the first level is lower than the second level, and is about 270 V. This sub routine will be described with reference to FIG. 15.

When the charge level is at the second level or higher in #1000, a second level flag F. L2 is set to 1 (#1015), and since it is higher than the first level, a first level flag F. L1 is also set to 1 (#1035). Thereafter the program proceeds to #1040. Otherwise, the flag F. L2 is cleared to 0 (#1010). Then, if the charge level is at the first level or higher in #1020, the first level flag F. L1 is set to 1 (#1035), and the program proceeds to #1040. Otherwise, the flag F. L1 is cleared to 0 (#1030), and the program proceeds to #1040.

The program returns from #1040 to the main routine.

[S2 ON]

Figure 16:
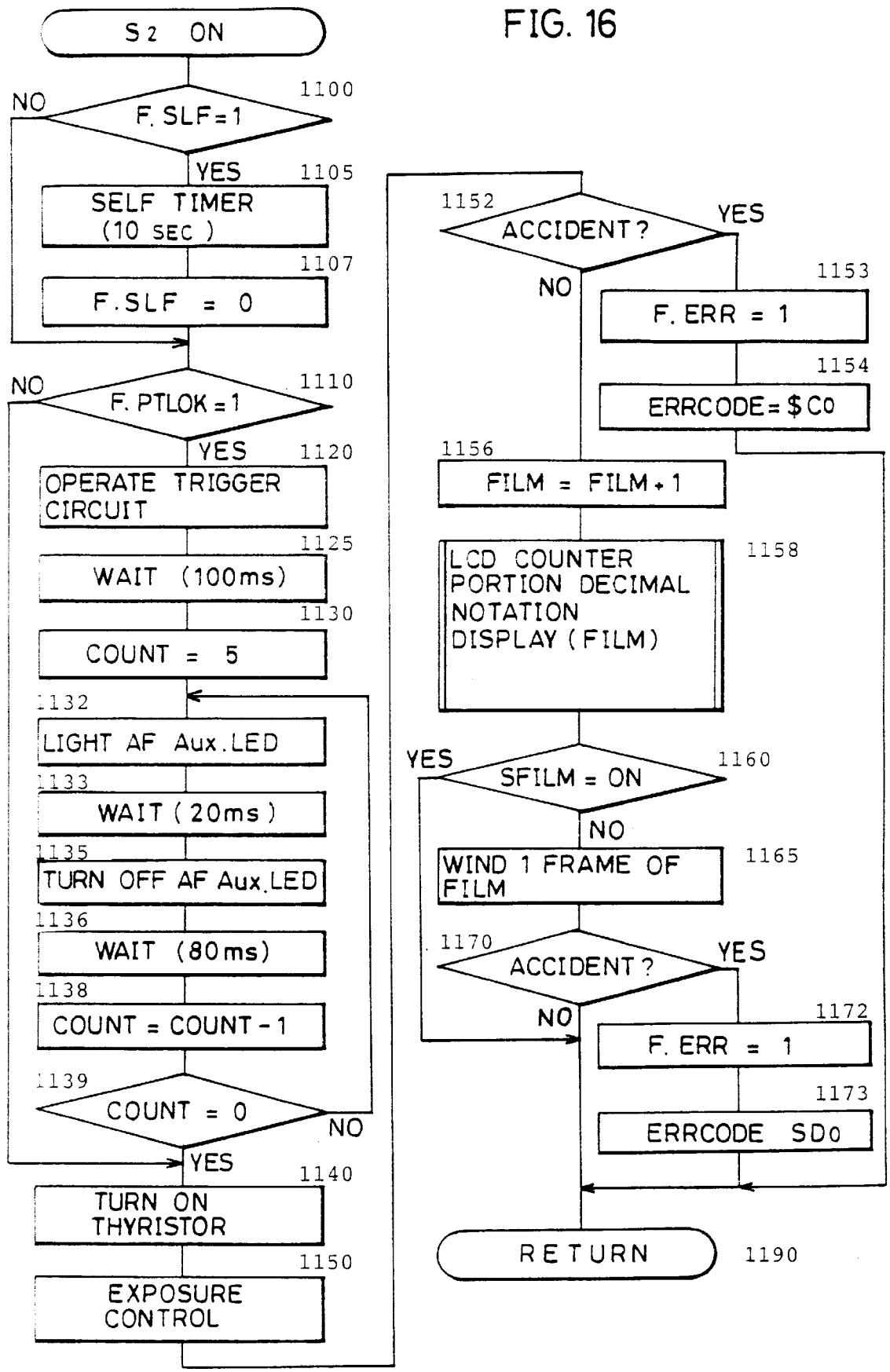
FIG. 16 is a flow chart of a sub routine [S2 ON].

The present subroutine is to carry out processings when the switch S2 is changed from OFF to ON with the switch S1 kept ON. This sub routine will be described with reference to FIG. 16.

In #1100, the value of the flag F. SLF is checked. If the self mode is set (F. SLF=1), the program proceeds to #1105. Otherwise, the program proceeds to #1110.

In #1105, a known self timer (10 sec) is operated, and after the end of operation, the flag F. SLF is cleared to 0 (#1107). This is to cancel the self mode for every one frame of photographing.

In #1110, the value of the flag F. PFLOK is checked. When pre emission is to be given (F. PFLOK=1), the program proceeds to #1120. Otherwise, it proceeds to #1140.

In #1120, the trigger circuit is activated for pre emission. At this time, since the thyristor is kept OFF, only the sub capacitor is discharged. Thereafter, waiting for 100 ms is conducted (#1125).

In #1130, 5 is input to a counter variable COUNT, and the program proceeds to #1132. Thereafter, the AF auxiliary LED is lit (#1132), waiting for 20 ms is conducted (#1133), the AF auxiliary LED is turned off (#1135), and waiting for 80ms is conducted (#1136). In #1138, the value of COUNT is decremented by 1, and whether the value COUNT reached 0 or not is checked (#1139). If the value COUNT is 0, the program proceeds to #1140. Otherwise, the flow returns to #1132. The processes from #1132 to #1138 are repeated five times, and the AF auxiliary LED is flickered five times with an interval of 100 ms each. This is to attract attention of the object person from the end of pre emission to the main emission. By this flickering, the object person does not erroneously regard the pre emission as the main photographing operation.

In #1140, the thyristor is turned ON to allow discharging of the main capacitor. Thereafter, a lens shutter is driven by a known method for effecting exposure control. At this point, whether or not an accident have occurred is checked (#1152). If there is any, the flag F. ERR is set to 1 (#1153), $CO is input to ERRCODE (#1154), and the program proceeds to #1190. Otherwise, it proceeds to #1156.

In #1156, 1 is added to the value of FILM, so as to increment the film count number FILM by 1. Then, the sub routine [LCD counter portion decimal notation display] is called [#1158] to update the film counter display of the LCD.

In #1160, the state of the switch SFILM is checked. If there is no film (SFILM=ON), it is not necessary to wind the film. Therefore, the program proceeds to #1190. Otherwise, the program proceeds to #1165 to wind the film up.

In #1165, one frame of the film is wound by a known method. At this point, whether or not there is an accident is checked. If there is any, the flag F. ERR is set to 1 (#1172), $D0 is input to ERRCODE (#1173), and the program proceeds to #1190. Otherwise, the program directly proceeds to #1190.

The program returns from #1190 to the main routine.
[Power Zoom (T)]

Figure 17:
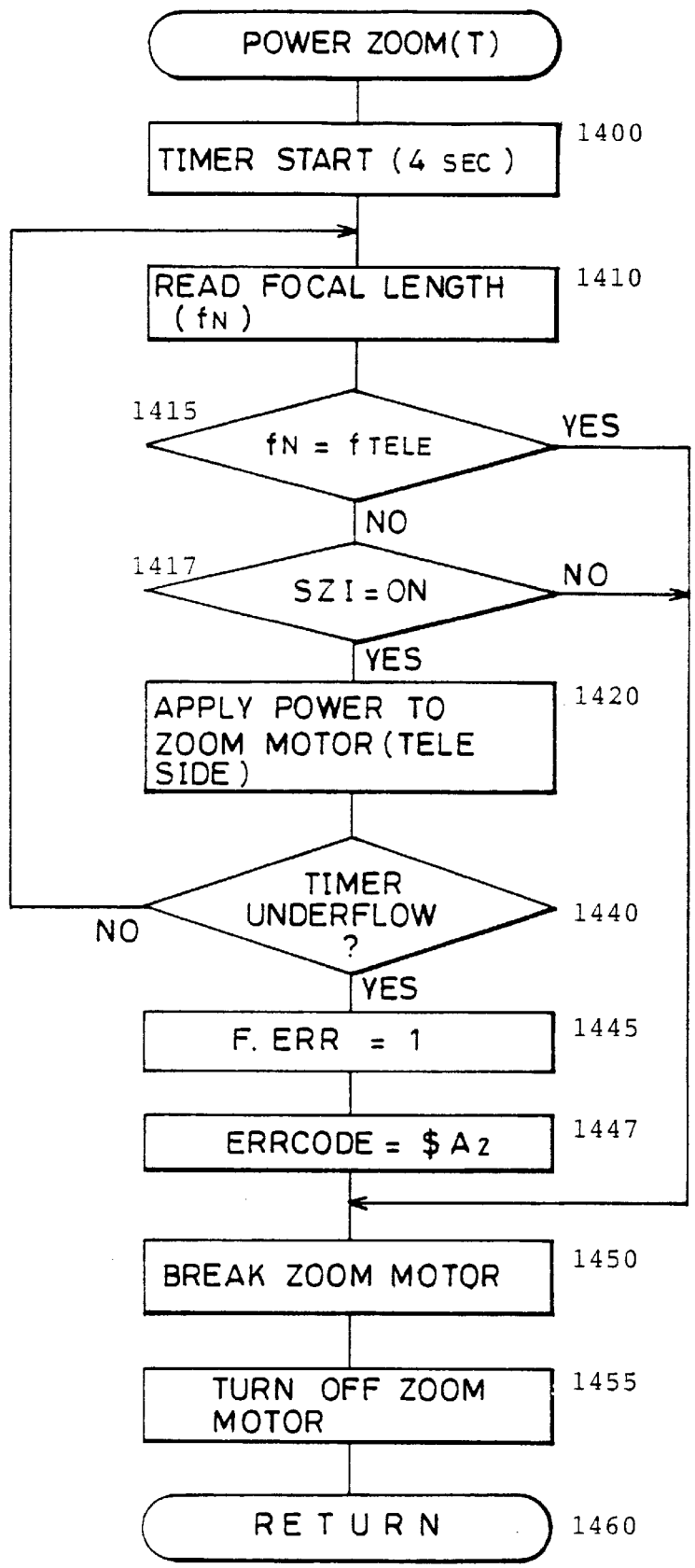
FIG. 17 is a flow chart of a sub routine [Power Zoom (t)].

This sub routine is to carry out power zooming to the tele side. This sub routine will be described with reference to FIG. 17.

In #1400, operation of a timer contained in the microcomputer is started, with the set time being 4 sec. This timer is used to detect generation of an accident during power zooming, which accident prevents completion of power zooming in a prescribed time period.

In #1410, the present focal length is read, and the read value is input to the present focal length fN.

In #1415, fN is compared with a tele end focal length value fTELE. If it is determined that the tele end has already been reached (fN=fTELE), the program proceeds to #1450. Otherwise, it proceeds to #1417.

In #1417, the state of the switch SZI is checked. If the switch SZI is ON, power is applied to the zoom motor (#1420) so as to effect zooming to the tele side, and the program proceeds to #1440. Otherwise, it proceeds to #1450.

In #1440, whether or not there is an underflow of the timer is checked. If there is an underflow, it is determined as an accident during power zooming, and the program proceeds to #1445. If the underflow is not generated, the flow returns to #1410.

In #1445, the flag F. ERR is set to 1, and $A2 is input to ERRCODE (#1447).

In #1450, the zoom motor is stopped, and then the zoom motor is turned OFF (#1455).

The program returns from #1460 to the main routine.
[Power Zoom (W)]

Figure 18:
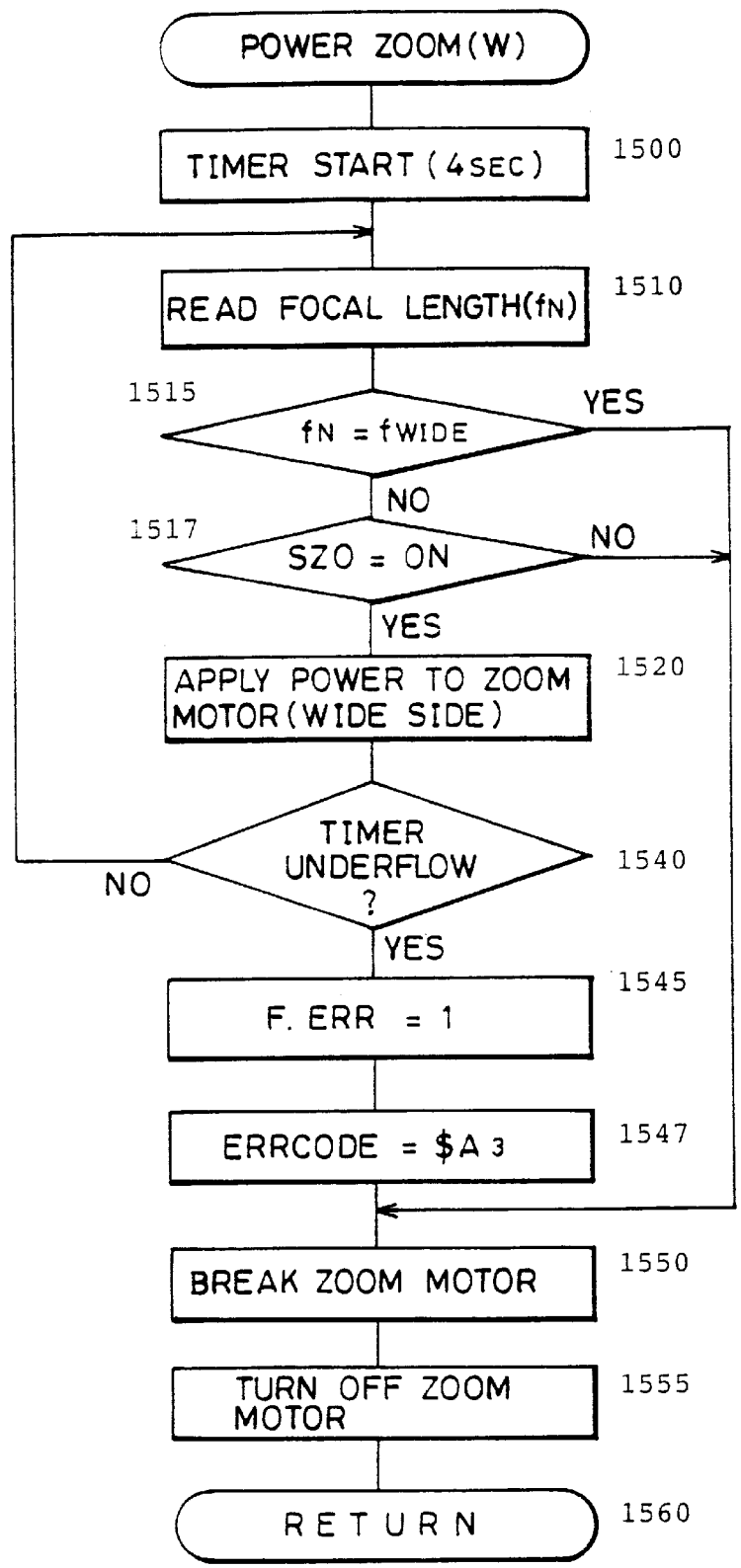
FIG. 18 is a flow chart of a sub routine [Power Zoom (w)].

This sub routine is to effect power zooming to the wide side. This sub routine will be described with reference to FIG. 18.

In #1500, operation of the timer contained in the microcomputer is started with the set time being 4 sec. This timer is used to detect generation of an accident during power zooming, which accident prevents completion of power zooming in a prescribed time period.

In #1510, the present focal length is read, and the value is input to the present focal length fN.

In #1515, fN is compared with fWIDE. If it is determined that the wide end has been already reached (fN=fWIDE), the program proceeds to #1550. Otherwise, the program proceeds to #1517.

In #1517, the state of the switch SZO is checked. If the switch SZO is ON, power is applied to the zoom motor so as to effect zooming to the wide side (#1520), and the program proceeds to #1540. Otherwise, the program proceeds to #1550.

In #1540, whether there is an underflow of the timer is checked. If there is an underflow generated, it is determined as an accident during the power zoom, and the program proceeds to #1545. If there is no underflow generated, the flow returns to #1510.

In #1545, the flag F. ERR is set to 1, and $A3 is input to ERRCODE (#1547).

In #1550, the zoom motor is stopped and, thereafter, the zoom motor is turned OFF (#1555).

The program returns from #1560 to the main routine.
[Flash Mode Change]

Figure 19:
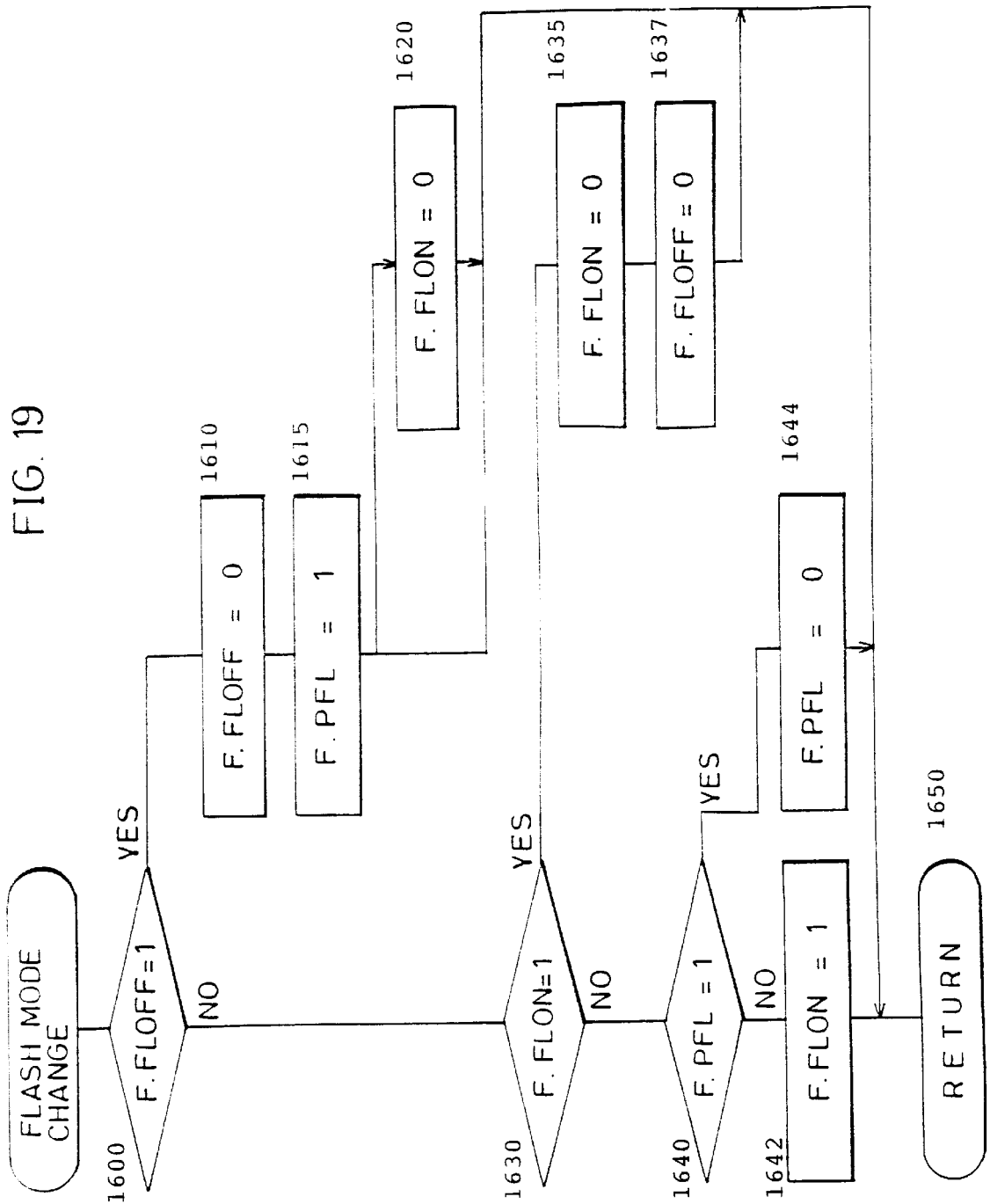
FIG. 19 is a flow chart of a sub routine [Flash Mode Change].

This sub routine is to change in cyclic manner the flash mode. The pre emission mode is also changed. This sub routine will be described with reference to FIG. 19.

In the present embodiment, there are the following four flash modes.

(a) automatic flash emission mode (pre emission allowed)
(b) automatic flash emission mode (pre emission prohibited)
(d) forced flash emission mode (without pre emission)
(e) emission prohibition mode These modes are identified by three flags, that is, F. FLON, F. FLOFFF, and F. PLF.

Namely,
| | | |
|---|---|---|
| (a) | F. FLON = 0 | |
| | F. FLOFF = 0 | |
| | F. PFL = 1 | |
| (b) | F. FLON = 0 | |
| | F. FLOFF = 0 | |
| | F. PFL = 0 | |
| (d) | F. FLON = 1 | |
| | F. FLOFF = 0 | |
| | F. PFL = 0 | |
| (e) | F. FLON = 0 | |
| | F. FLOFF = 1 | |
| | F. PFL = 0 | |

These modes can be selected in cyclic manner as shown below.

$(a) \rightarrow (b) \rightarrow (d) \rightarrow (e)$

In #1600, the value of the flag F. FLOFF is checked. If it corresponds to (e) (F. FLOFF=1), then the flag F. FLOFF is cleared to 0 (#1610), and the flag F. PFL is set to 1 (#1615).

In #1630, the value of the flag F. FLON is checked. If the flag F. FLON is 1, it means that the mode is (d), the program proceeds to #1635 so that the flag F. FLON is cleared to 0 for setting the mode (e) (#1635), the flag F. FLOFF is set to 1 (#1637), and the program proceeds to #1650.

In #1640, the value of the flag F. PFL is checked. If it is (b), the flag F. FLON is set to 1 (#1642) for setting the mode (d). Otherwise, it means that the mode is (a), so that the flag F. PFL is cleared to 0 (#1644) to set the mode (b). In either case, the program proceeds to #1650. The flow returns from #1650 to the main routine.

[Charge]

Figure 20:
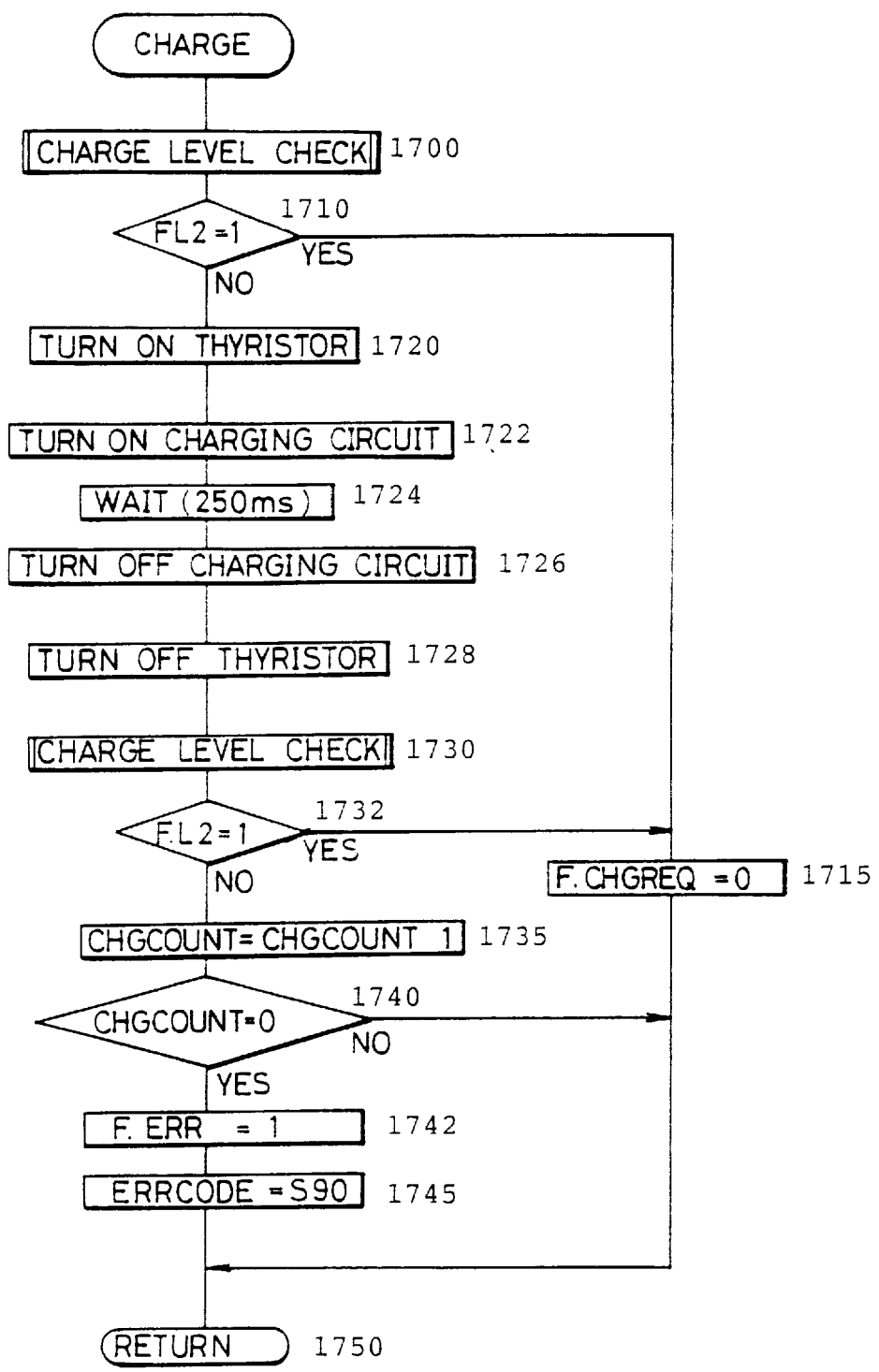
FIG. 20 is a flow chart of a sub routine [Charge].

This sub routine is to control charging of capacitors for emitting flash light. The sub routine will be described with reference to FIG. 20.

In #1700, a sub routine [charge level check] is called for checking the level of charging of the capacitor for emitting flash light. The value of the flag F. L2 is checked. If the charge level has already reached the second level (F. L2=1), additional charging is not necessary. Therefore, the flag F. CHGREQ is cleared to 0 (#1715), and the program proceeds to #1750. Otherwise, the flow proceeds to #1720 so as to carry out additional charging.

In #1720, the thyristor is turned ON, and the charging circuit is turned ON (#1722). After a lapse of a prescribed time period (250 ms) (#1724), the charging circuit is turned OFF (#1726), and the thyristor is turned OFF (#1728).

In #1730, the sub routine [charge level check] is called so as to check again the charge level of the capacitors for emitting flash light. The value of the flag F. L2 is checked. If the charge level has reached the second level (F. L2=1), it means that the charging is completed and further charging is not necessary. Therefore, the flag F. CHGREQ is cleared to 0 (#1715), and the program proceeds to #1750. Otherwise, the flow proceeds to #1735.

In #1735, the value of CHGCOUNT is decremented by 1, so as to count the number of charging.

In #1740, the value of CHGCOUNT is checked. If CHGCOUNT has reached 0, the program proceeds to #1742. Otherwise, it proceeds to #1750.

In #1742, the flag F. ERR is set to 1, and $90 is input to ERRCODE (#1745).

The flow returns from #1750 to the main routine.

[LCD Counter Portion Decimal Notation Display]

Figure 21:
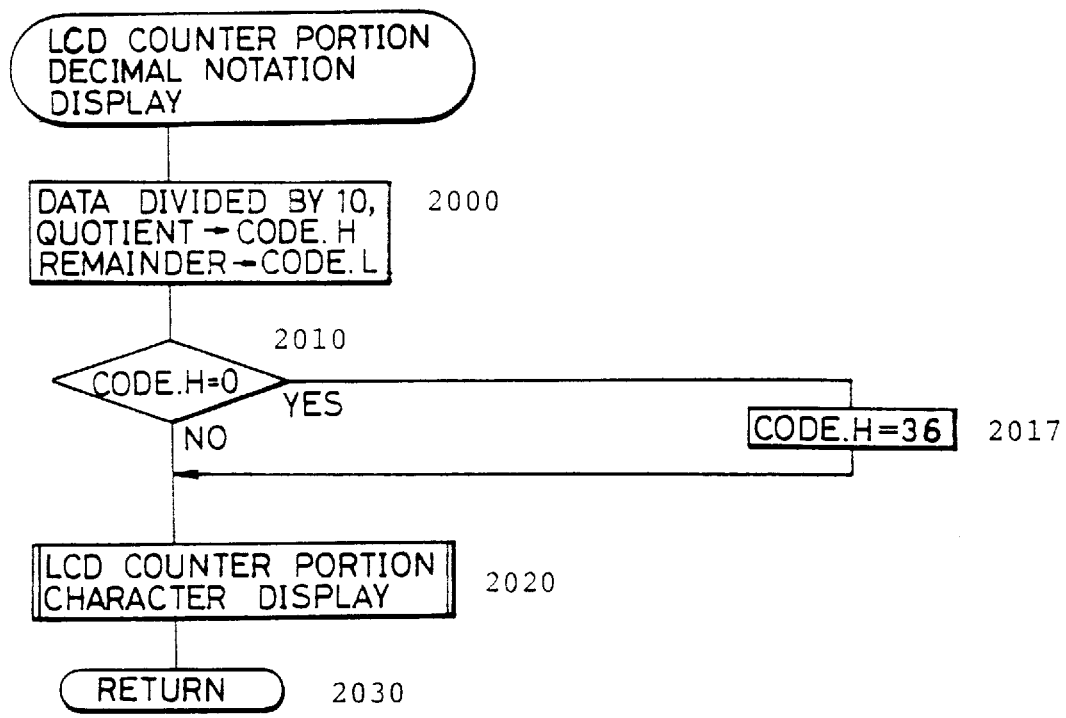
FIG. 21 is a flow chart of a sub routine [LCD Counter Portion Decimal Notation Display].

This sub routine is to display given data at the film counter portion of the LCD in digital (decimal) notation. This sub routine will be described with reference to FIG. 21.

In #2000, a quotient provided when a given data is divided by 10 is input to the character code CODE. H of higher significance, and the remainder is input to the character code CODE. L of lower significance. For example, when 24 is given, 2 is input to CODE. H and 4 is input to CODE. L.

In 2010, the value of Code. H is checked. If it is 0, it proceeds to #2017, and the value of CODE. H is replaced by 36, which corresponds to a blank (#2017). Otherwise, the flow proceeds to #2020. In #2020, a sub routine [LCD counter portion character display] is called so as to give display based on the values of CODE. H and CODE. L.

The program returns from #2030 to the main routine.

[LCD Counter Portion Hexadecimal Notation Display]

Figure 22:
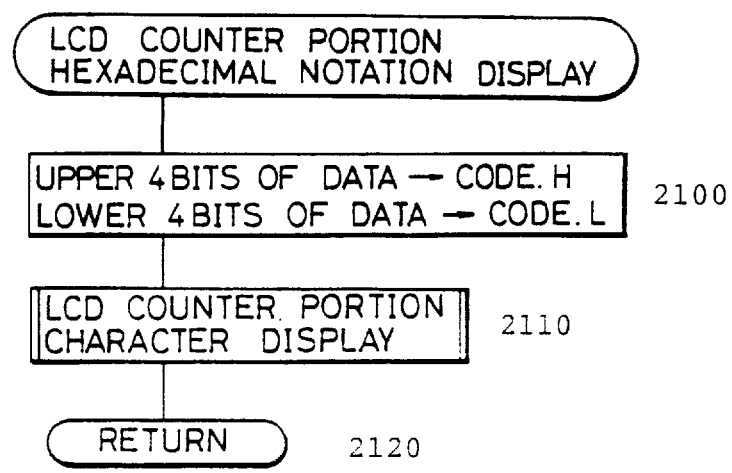
FIG. 22 is a flow chart of a sub routine [LCD Counter Portion Hexadecimal Notation Display].

This sub routine is to display given data at the film counter portion of the LCD by digital (hexadecimal) notation. This sub routine will be described with reference to FIG. 22.

In #2100, a number represented by higher 4 bits of the given data is input to CODE. H, and a number represented by the lower 4 bit is input to CODE. L. For example, if $A8 is given, 10 is input to CODE. H, and 8 is input to CODE. L.

In #2110, a sub routine [LCD counter portion character display] is called, so as to provide display based on the values of CODE. H and CODE. L.

The program returns from #2110 to the main routine.

[LCD Counter Portion Hexadecimal Notation Display 2]

Figure 23:
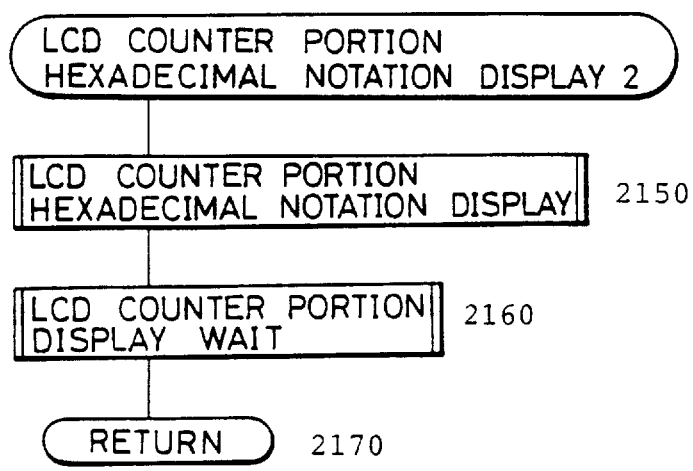
FIG. 23 is a flow chart of a sub routine [LCD Counter Portion Hexadecimal Notation Display 2].

In this sub routine, given data is displayed for about 1 sec by digital(hexadecimal) notation, at the film counter portion of the LCD. This is to ensure sufficient time period for reading the data. This sub routine will be described with reference to FIG. 23.

In #2150, the sub routine [LCD counter portion hexadecimal notation display] is called for providing the display, and a sub routine [LCD counter portion display wait] is called (#2160) for waiting.

The program returns from #2170 to the main routine.

[LCD Counter Portion Character Display]

FIG. 24 shows correspondence between the characters and numerals displayed on the LCD and the code numbers.

In this sub routine, respective segments (1a to 1g) of the second digit of the film counter are lit or turned off corresponding to the code number designated by CODE. H, and respective segments (2a to 2g) of the first digit are lit or turned off corresponding to the code number designated by CODE. L. Details of this sub routine will not be described.

[LCD Counter Portion Display Wait]

Figure 25:
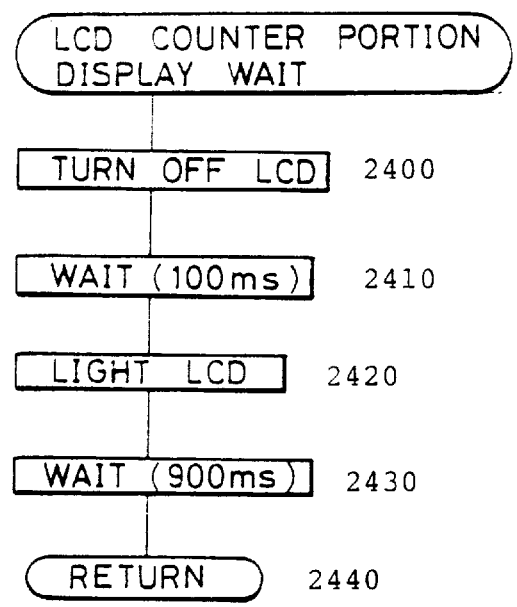
FIG. 25 is a flow chart of a sub routine [LCD Counter Portion Display Wait].

This sub routine is to provide sufficient time to read the data displayed on the LCD, and to enable discrimination of data when a plurality of data are to be displayed continuously. This sub routine will be described with reference to FIG. 25.

In #2400, the LCD is turned off while maintaining the content to be displayed on the LCD. After the time lapse of 100 ms (#2410), the LCD is lit again (#2420), and waiting is conducted for 900 ms (#2430). Since the display is maintained for about 1 sec, it is possible to confirm the displayed content. In addition, since a short period of time is provided in which the display is kept off, displays can be discriminated from each other even when the similar data are continuously displayed.

The flow returns from #2440 to the main routine.

[EEPROM Data Writing]

Figure 26:
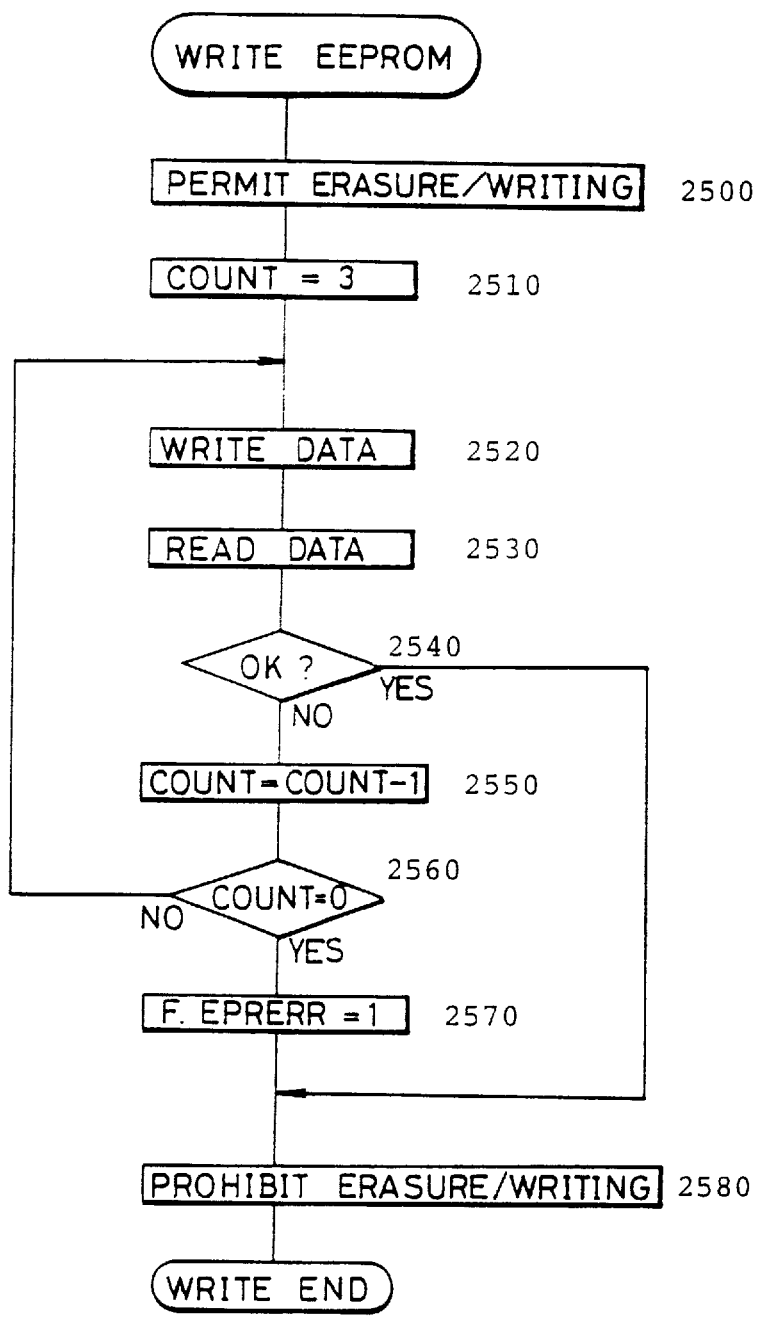
FIG. 26 is a flow chart showing processes for writing data to EEPROM.

Writing of data to the EEPROM is carried out in accordance with the flow chart of FIG. 26 data by data. When a plurality of data are to be written, the routine is repeated for the number of data. Description will be given with reference this figure.

In #2500, the EEPROM is set to a state allowing erasing/writing of data. In #2510, 1 is input to COUNT.

In #2520, writing of data is executed. Immediately thereafter, the data is read (#2530) so as to confirm whether or not the writing was done properly. If the read data is the same as the written data, the flow proceeds to #2580. Otherwise, the value of COUNT is decremented by 1 (#2550).

In #2560, whether or not COUNT has become 0 is checked. If COUNT is 0, it means that writing of data to the EEPROM was failed three times continuously. Therefore, it is regarded as an accident in writing to the EEPROM, and the flag F. EPRERR is set to 1 (#2570). Otherwise, the flow returns to #2520 so as to execute writing again.

In #2580, the EEPROM is set to a state prohibiting data erasure/writing. In this manner, normally the EEPROM is set in a state prohibiting erasure/writing of data, so as to prevent erroneous rewriting of data.

Writing of one data is completed in this manner.

<<Description of the Check Mode>>

By turning ON the switch SCHECK, the operation is set in a check mode. When the check mode is started, setting of the photographing mode of the camera is automatically set to a state suitable for the check mode. Namely, the flash mode is set to the emission prohibition mode, preventing automatic emission of flash light during adjustment of exposure. The self mode and the APZ mode are canceled to prevent unnecessary functions during adjustment and the like.

The menu and functions of the check mode of the present embodiment are shown in table 1. In the check mode, menu is represented by characters at the film counter portion of the LCD. Since characters allowing association of function are selected to be displayed, it is more convenient for the user compared with other types of cameras in which the menu is displayed by numbers. Selection of menu is done by the switch SZI or SZO.

TABLE 1

CHECK MODE MENU

| MENU NO. | MENU DISPLAY | FUNCTION EXECUTED BY S2 | FUNCTION EXECUTED BY SSLF |
|---|---|---|---|
| 1 | Er | Error Code Display | Error Code Erasure |
| 2 | Ev | — | Brightness Measurement Adjustment |
| 3 | EE | Releasing for Adjustment | TAED Change |
| 4 | bc | — | Prohibiting Level Adjustment |

By turning on the switch S2 or SSLF, various functions in the menu is executed. Since the switch S2 is related to the shutter release button, operation thereof is easy. In addition, unlike the switch S1, erroneous pressing of the switch S2 hardly occurs. The switch SSLF is rather hard to operate. Therefore, the switch S2 is used for confirmation function and the like, while the switch SSLF is used for adjustment including rewriting of data in the EEPROM. Thus, erroneous change of the data of in the EEPROM due to miss operation of the switch can be prevented. Although switches S2 and SSLF are used, other switched may be used. In addition, only one switch may be used to execute all functions, or three or more switches may be used.

While the menu is displayed and switching ON of the switch S2 or SSLF is waited for, the self mark of the LCD is kept flickering. When any of the various functions is being carried out, the self mark of the LCD is kept continuously on. Therefore, whether or not the camera is in the waiting state can be easily known.

As to the check of the LCD, when the switch SAPZ is turned on during the waiting state (irrespective of the content of menu), the LCDs are all lit while the switch SAPZ is ON.

The check mode is terminated when the switch SM is turned OFF. Thus the control is changed to the normal control program.

Figure 27A:
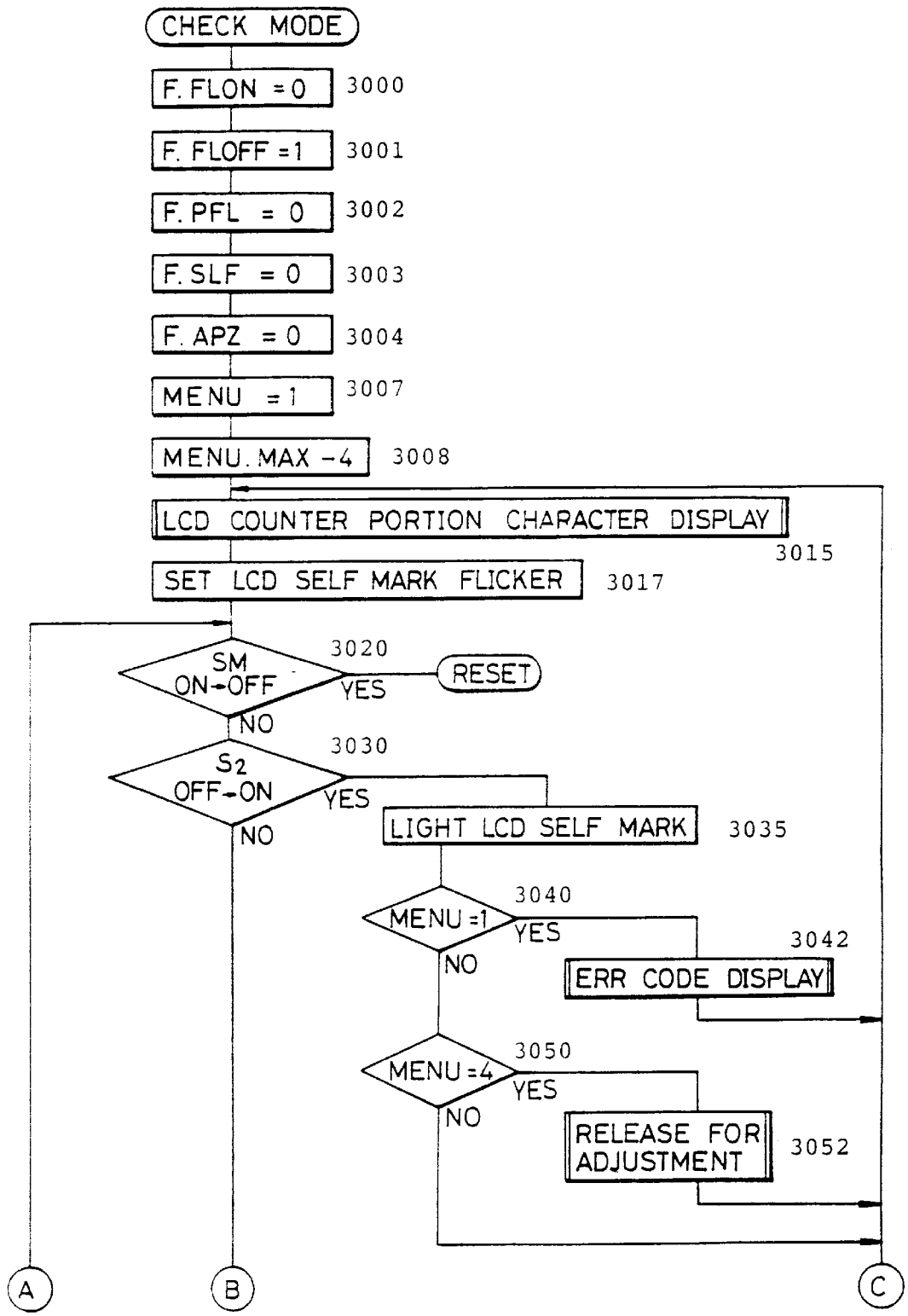
FIGS. 27A and 27B are flow charts of a check mode.
Figure 27B:
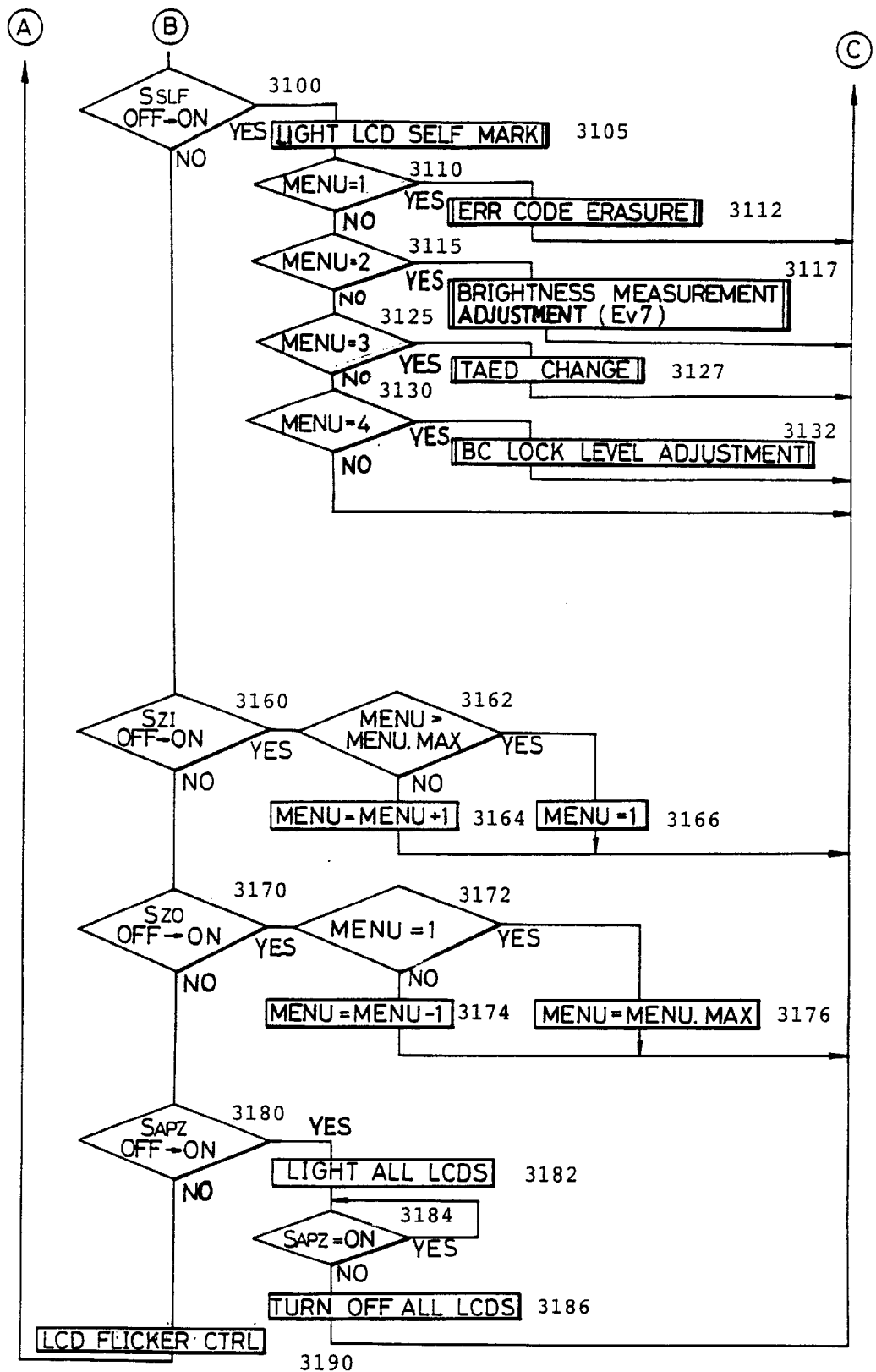

FIGS. 27A and 27B are flow charts of the check mode. The entire flow will be described. Sub routines will be described later.

First, in order to set the flash mode to the emission prohibition mode, the flag F. FLON is cleared to 0 (#3000), the flag F. FLOFF is set to 1 (#3001), and the flag F. PFL is cleared to 0 (#3002). Then, in order to cancel the self mode, the flag F. SLF is cleared to 0 (#3003), and to cancel the APZ mode, the flag F. APZ is cleared to 0 (#3004).

In #3007, 1 is input to a menu number MENU so as to have the initial menu at the start of the check mode displayed as error code display. The check mode is usually used when the camera is to be repaired. In order to find the cause of malfunction, error code display is frequently used at the start.

In #3008, 4 is input to the maximum value MENU. MAX of the MENU, so that menus 1 to 4 are made available.

In #3015, the sub routine [LCD Counter Portion Character Display] is called to provide display based on the values of CODE. H and CODE. L.

In #3017, the self mark of the ACD is set to be flickered in the waiting state.

In #3020, the change of the switch SM is checked. If the switch SM is changed from ON to OFF, the program flows to reset, to return to the normal control program. Otherwise, the flow proceeds to #3030.

In #3030, the change of the switch S2 is checked. If the switch S2 is changed from OFF to ON, the self mark of the LCD is changed from flickering to continuously on state (#3035), and the flow proceeds to #3040. Otherwise, the program proceeds to #3100.

In steps #3040 to #3050, the value of MENU is checked, so as to determine the menu number and to call a sub routine executing the corresponding function. More specifically, if MENU=1, the sub routine [Error Code Display] is called (#3042). If MENU=4, the sub routine [Releasing for Adjustment] is called (#3052). Otherwise, no operation is carried out, and in any case, the flow returns to #3010.

In #3100, the change of the switch SSLF is checked. If the switch SSLF has been changed from ON to OFF, the self mark of the LCD is changed from flickering to continuously lit state (#3105), and the flow proceeds to #3110. Otherwise, the flow proceeds to #3160.

In steps #3110 to #3130, the value of MENU is checked to determine the menu number and to call a sub routine for executing the corresponding function. Namely, if MENU=1, the sub routine [Error Code Erasure] is called (#3112), if MENU=2, the sub routine [Brightness Measurement Adjustment] is called (#3117). If MENU=3, a sub routine [TAED Change] is called (#3127), and if MENU=4, a sub routine [Prohibiting Level Adjustment] is called (#3132). If the value of MENU does not corresponds to any of these values, no operation is carried out. In any case, the flow returns to #3010.

In #3160, the change of the switch SZI is checked. If the switch SZI is changed from OFF to ON, the flow proceeds to #3162. Otherwise, it proceeds to #3170.

In #3162, magnitude of MENU and MENU. MAX is compared. If MENU≦MENU. MAX, 1 is input to MENU (#3166). Otherwise, 1 is added to the value of MENU (#3164), and the program returns to #3010, in which the menu display is updated.

In #3170, the change of the switch SZO is checked. If the switch SZO is changed from OFF to ON, the flow proceeds to #3172, and otherwise it proceeds to #3180.

In #3172, MENU is compared with 1. If Menu=1, the value of Menu. MAX is input to MENU (#3176). Otherwise, the value of MENU is decremented by 1 (#3174). Then the program returns to #3010 to update menu display.

In #3180, the state of the switch SAPZ is checked. If SAPZ is ON, the LCDs are all lit (#3182), and in #3184, waiting is conducted until the switch SAPZ is turned OFF. When the switch SAPZ becomes OFF, the LCDs are all turned off once (#3186) so as to prevent unnecessary portions of the display kept lit when the menu display is provided again. Then the program returns to #3010.

In #3190, flickering control of the LCD is effected. Then the program returns to #3020.

[Error Code Display]

This function is to check history of malfunctions of the camera before repairing the camera and the like. What kind of malfunction occurred in what order, whether the similar malfunction have occurred continuously or not, whether malfunctions have occurred at various portions or not can be known. Such information is helpful to repair the camera, and it serves to reduce time required for the repair.

By turning ON the switch S2 when the menu display is "Er" (ERROR), last four error codes are displayed starting from the older one at the film counter portion of the LCD with an interval of about 1 sec (ERR4→ERR3→ERR2→ERR1). After the end of display, the control automatically return to the waiting state.

Figure 28:
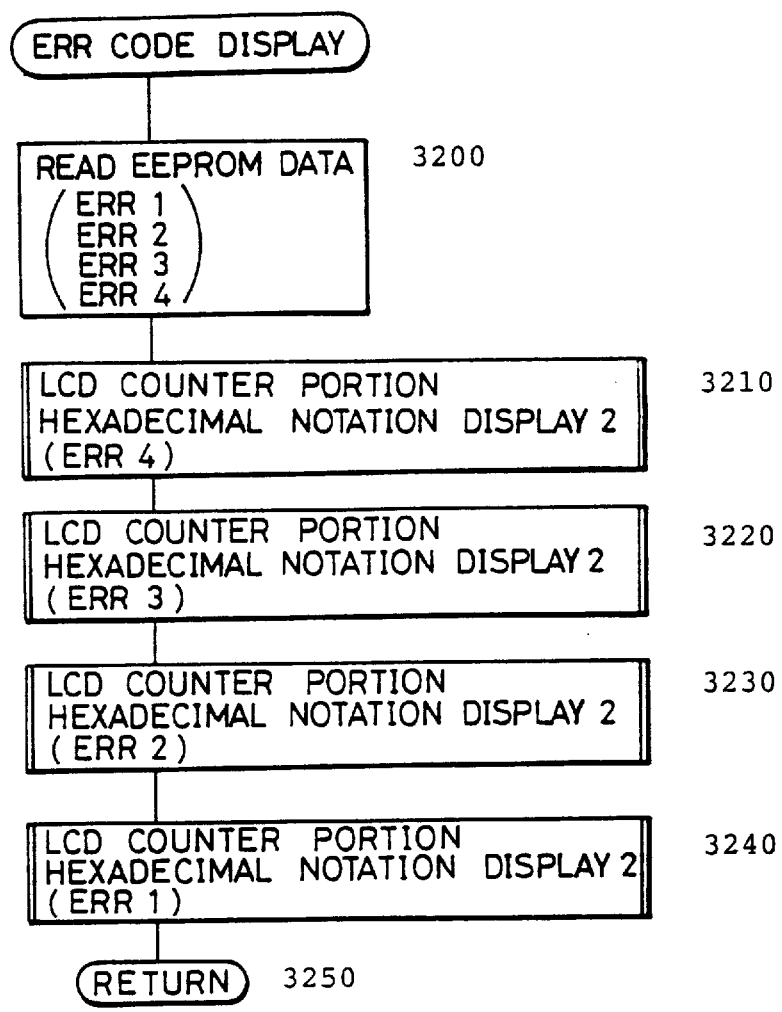
FIG. 28 is a flow chart of a sub routine [Error Code Display].

The processings in this sub routine will be described with reference to FIG. 28.

In #3200, four error codes (ERR1, ERR2, ERR3 and ERR4) are read from the EEPROM.

Then, the sub routine [LCD Counter Portion Hexadecimal Notation Display 2] is called for four times (#3210 to #3240) so as to display the error codes starting from the oldest one (ERR4→ERR3→ERR2→ERR1) at the film counter portion of the LCD with an interval of about 1 sec.

Then the program returns from the step #3250.

[Error Code Erasure]

This function is to erase, after the camera is repaired, the history of malfunctions before the repair. When a camera which has been repaired once is to be repaired again and the history of malfunction is referred to, some time it is desirable to know whether or not the malfunction has occurred after the last repair or before the last repair. By erasing the malfunction history every time the repair is completed, it is easily known that the malfunction has occurred after the last repair.

Figure 29:
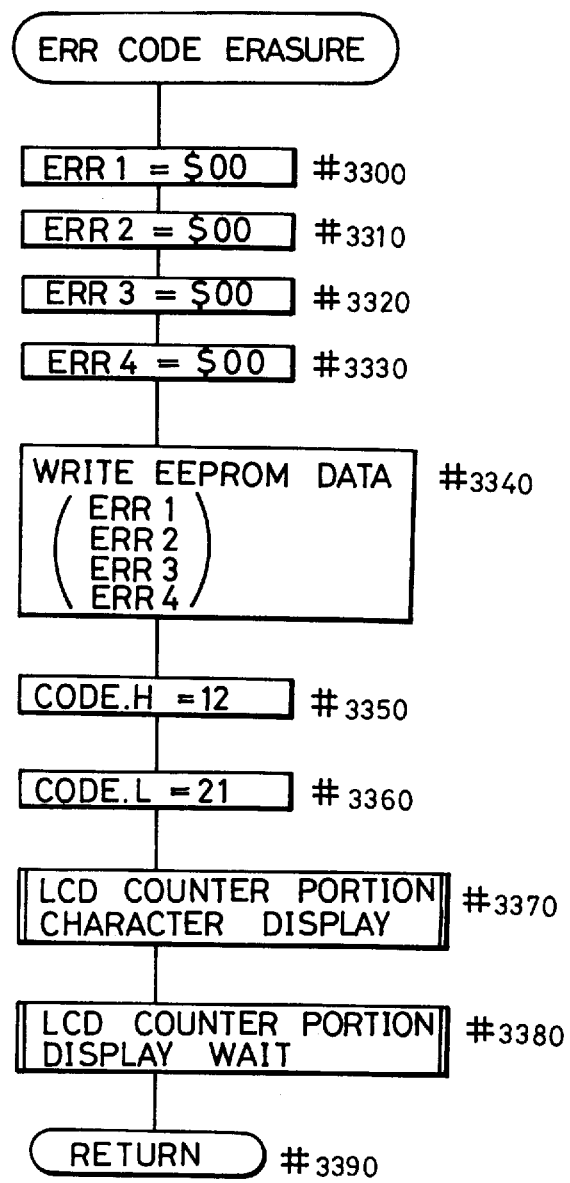
FIG. 29 is a flow chart of a sub routine [Error Code Erasure].

By turning ON the switch SSLF when the menu display is "Er", four error codes are all erased and the code is set to the initial value $00. In order to confirm the erasure, "cL" (CLEARE) is displayed for about 1 sec at the film counter portion of the LCD. After the display, the program automatically returns to the waiting state. The processings in this sub routine will be described with reference to FIG. 29.

In #3300 to #3330, the initial value $00 is input to every one of the four error codes (ERR1, ERR2, ERR3 and ERR4), and these are written to the EEPROM in #3340.

Thereafter, in order to display "cL" at the film counter portion of the LCD for about 1 sec as a confirmation, 12 is input to CODE. H (#3350), 21 is input to CODE. L (#3360), the sub routine [LCD Counter Portion Character Display] is called (#3370), and the sub routine [LCD Counter Portion Display Wait] is called (#3380).

Then the program returns from #3390.

[Brightness Measurement Adjustment]

This sub routine is to carry out adjustment of brightness measuring value. Reference brightnesses are provided in a lighting box having standard luminance (in this embodiment, Bv=15, Bv=7), brightness measurement (A/D) is effected by the camera, and the measured brightness value (ND value) is stored. When brightness is measured before photographing operation, by calculating the brightness measuring value based on the stored value, more accurate brightness value can be provided. Description of the details of this operation is omitted.

[Releasing for Adjustment]

This is effected in combination with [TAED Change] to adjust exposure. This function is used for measuring the exposure level by means of an EE tester for adjusting exposure. Prior to the adjustment of exposure, the above described adjustment of brightness measurement must be done. The film sensitivity is automatically set to ISO 100. AF is not carried out from the following reasons. In the phase difference detecting type AF as in the present embodiment, when exposure characteristic is to be confirmed by a lighting box having standard luminance, in-focus state can not be realized, since the luminous surface of the box does not have contrast, and since the distance is too short. In the normal photographing sequence, releasing is locked unless the in-focus state is realized. Since there is no function to switch to the manual focussing as provided in an AF single lens reflex camera, confirmation of exposure characteristic by means of the lighting box having standard luminance is impossible. Therefore, in such case, AF is prohibited.

Figure 30:
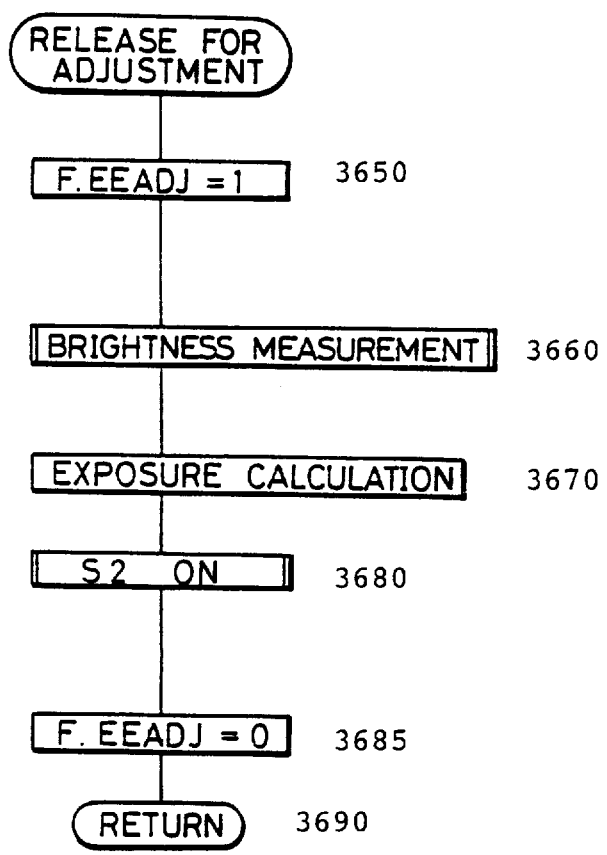
FIG. 30 is a flow chart of a sub routine [Releasing for Adjustment].

By turning ON the switch S2 when the menu display is "EE" (EE ADJUST), the exposure operation is carried out. This sub routine will be described with reference to FIG. 30. In #3650, the flag F. EEADJ is set to 1 to fix the control for uniform brightness measuring, without correcting the Bv for high brightness, since it is the exposure adjustment mode.

In #3660, the sub routine [brightness measurement] is called for brightness measurement, exposure calculation is effected (#3670), and the sub routine [S2 ON] is called for effecting the exposure operation (#3680).

In #3685, the flag F. EEADJ is cleared to 0, and the sub routine [LCD counter portion APEX data display 2] is called for displaying the shutter control data EV at the film counter portion of the LCD for about 1 sec.

The flow returns from #3690 to the main routine.

[TAED Change]

This is used in combination with [Releasing for Adjustment] to adjust exposure. This function is to change the value of TAED written in the EEPROM, based on the exposure level measured by the EE tester for exposure adjustment.

Figure 31:
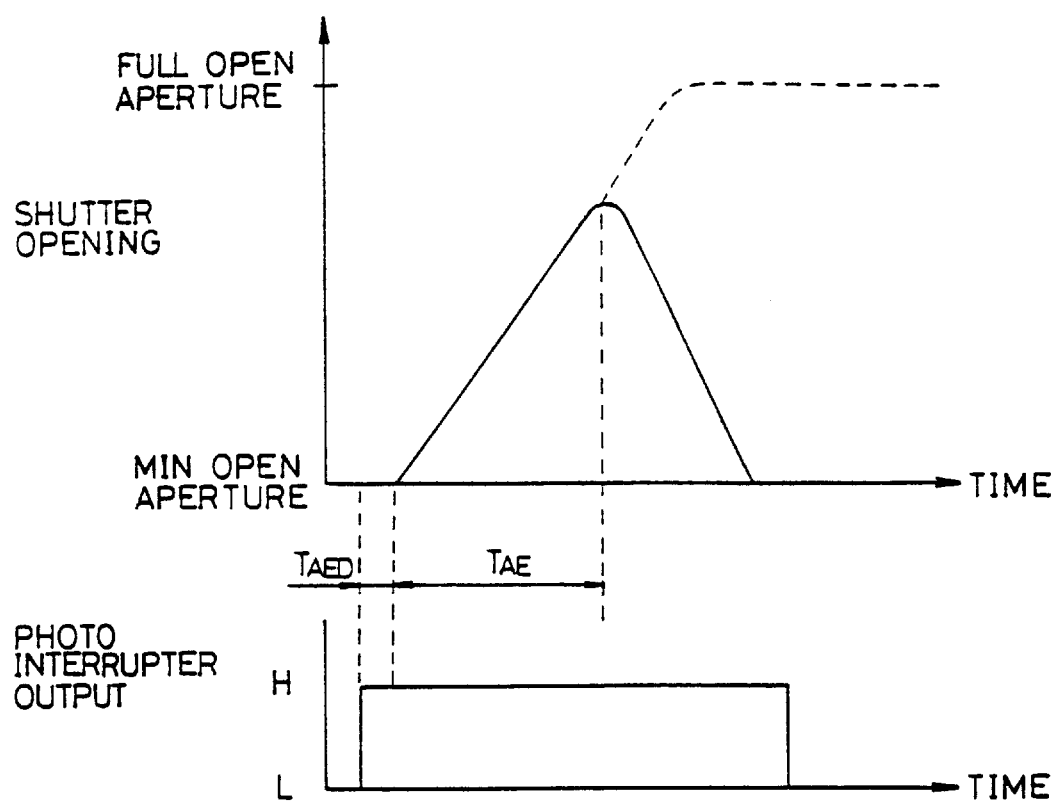
FIG. 31 shows relation between an opening waveform of a lens shutter and an output waveform of a photo interrupter.

TAED will be described. TAED is a parameter of shutter delay time (20 $\mu$s unit). FIG. 31 shows relation between lens shutter opening waveform and an output waveform of a photo interrupter for detecting closing/opening of the shutter. The output from the photo interrupter is "L" when the shutter is fully opened or fully closed, and otherwise it is "H". As is apparent from the figure, there is a delay time from the change of the output from the interrupter from "L" to "H" until the start of opening of the shutter. This corresponds to TAED. The exposure is controlled by setting a reference value of TAED. However, actually, every shutter has its own delay time, so that error in exposure occurs dependent on the difference between the set reference value are its own delay time. This error tends to be larger when the brightness becomes larger. TAED must be adjusted so as to provide proper exposure when the brightness is high.

When the exposure level is on the "over" side, the value of TAED is shortened to start earlier counting of exposure time, so as to reduce substantial time of exposure. When the exposure level is on the "under" side, the value of TAED is made longer to increase substantial exposure time. The exposure level is adjusted in this manner.

By turning ON the switch SSLF when the menu display is "EE", the TAED change mode is started. The value of TAED is digitally displayed (by decimal notation) at the film counter portion of the LCD, the unit of which is 20 $\mu$s. The value is changed by using the switches SZI and SZO. By turning the switch SZI ON once, the value is incremented by 1. By turning ON the switch SZO once, the value is decremented by 1. When a desired value is reached, the switch SFL is turned on, so as to rewrite the EEPROM, terminate the changing mode, and the program returns to the waiting state.

Figure 32:
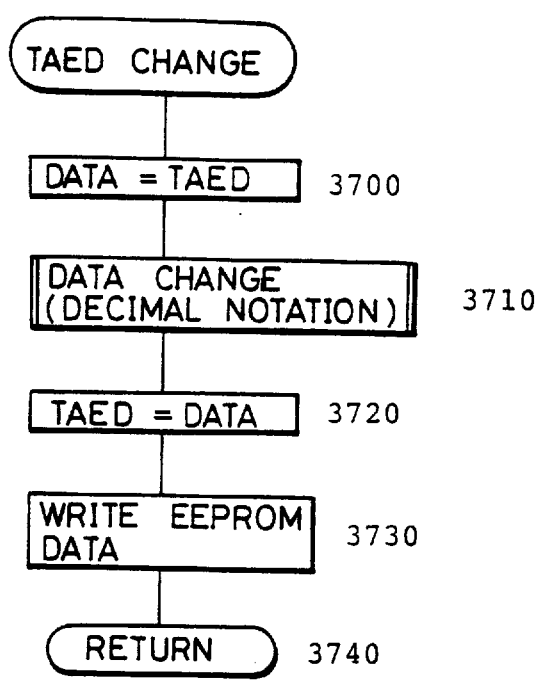
FIG. 32 is a flow chart of a sub routine [TAED Change].

The processings in this sub routine will be described with reference to FIG. 32.

In #3700, the value of TAED is input to DATA, and the sub routine [Data Change (Decimal Notation Display Method)] is called, so as to change the value of DATA by using the switches SZI and SZO (#3710). The changed value of DATA is input to TAED (#3720), and TEAD is written to the EEPROM (#3730).

Then the flow returns from #3740.

[Prohibiting Level Adjustment]

This function is used for adjusting the prohibiting level. For this purpose, a battery jig set under the worst power supply conditions must be connected to the camera instead of a battery.

When the menu display is "bc" (prohibition), the worst power supply conditions (prohibiting voltage) are set in the camera, and by turning ON the switch SSLF, BC is carried out. The A/D value at that time is written as the reference value to the EEPROM. In actual BC, BC is carried out based on the A/D value. The description of the details is omitted.

[Data Change (Decimal Notation Displaying Method)]

Figure 33:
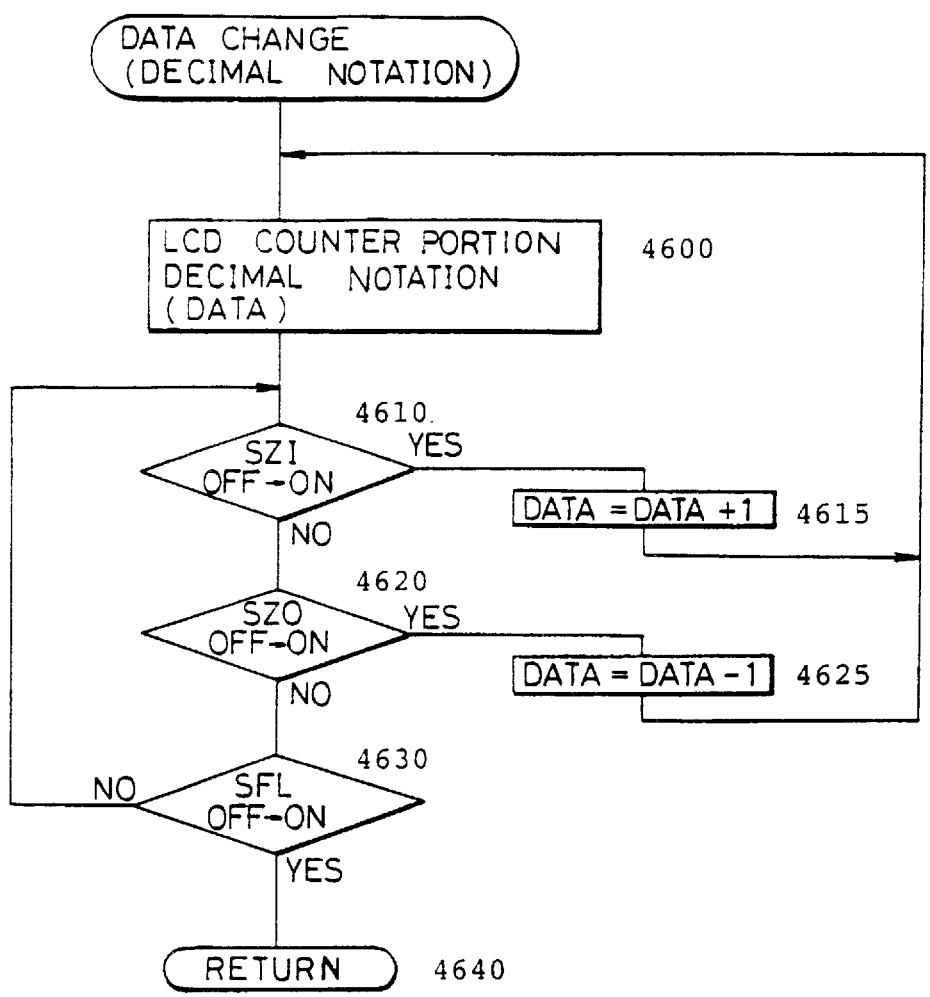
FIG. 33 is a flow chart of a sub routine [Data Change (Decimal Notation Display)].

This sub routine is to change data by using the switches SZI and SZO. The data are represented by decimal notation. The processings of this sub routine will be described with reference to FIG. 33.

In #4600, in order to display DATA at the LCD digitally (by decimal notation), the sub routine [LCD Counter Portion Decimal Notation Display] is called.

In #4610, the change of the switch SZI is checked. Only when the switch SZI is changed from OFF to ON, 1 is added to the value of DATA (#4615), and the program returns to #4600 in which the display is updated.

In #4620, the change of the switch SZO is checked. Only when the switch SZO is changed from OFF to ON, the value of DATA is decremented by 1 (#4625), and the flow returns to #4600 in which the display is updated.

In #4630, the change of the switch SFL is checked. When the switch SFL is changed from OFF to ON, the flow proceeds to #4640. Otherwise, it returns to #4610.

The flow returns from #4640 to the main routine.

As is apparent from the foregoing, when the check mode is used, the states of various portions of the camera can be checked only by operating switches provided on the camera while monitoring the LCDs, provided that measuring equipments and devices (lighting box having standard luminance, AE tester, power supply and so on) for general purposes are available. It is not necessary to electrically connect the camera to other external adjustment machines or to other accessories.

As to the display by the LCDs, only the film counter and some marks which are usually provided on most types of cameras are used. Therefore, it is not necessary to provide extra display portion for the check mode on the LCDs. It goes without saying that when there are various and many display portions as in the case of a single lens reflex camera, these display portions may be used to facilitate reading of the display.

As to actual operation, the number of necessary switches is small, so that the switches which are inherently provided on the cameral may be used, and it is not necessary to provide new switches for adjustment.

The objects of adjustment are not limited to those described in this embodiment. By adding programs for the check mode, AF adjustment, for example, can be carried out in similar manner.

As described above, hardly anything new is necessary to employ the check mode of the present embodiment. What is necessary is only to add programs for adjustment to the programs of the microcomputer. Therefore, a camera having adjustment function with superior ability of operation can be provided without increasing cost. This may be applied to most types of cameras such as single lens reflex cameras, lens shutter cameras, electronic still cameras.

Although the present invention has been described and illustrated in detail, it is clearly understood that the same is by way of illustration and example only and is not to be taken by way of limitation, th e spirit and scope of the present invention being limited only by the terms of the appended claims.

What is claimed is:

1. A camera comprising:
   means for changing a condition of the camera from one in which photography cannot be carried out to another condition in which photography can be carried out;
   selecting means for selecting an automatic program zoom mode in which a focal length of a photographing lens is automatically determined based on a prescribed program, and a manual zoom mode in which the focal length of said photographing lens is determined by an arbitrary operation; and
   control means for making said selecting means select the automatic program zoom mode in response to operation of said condition changing means, irrespective of a zoom mode previously selected via said selecting means.

2. A camera according to claim 1, wherein said control means includes switching means for switching between a first state in which said automatic program mode is selected by said selecting means responsive to operation of the condition changing means, and a second state in which said manual zoom mode is selected.

3. A camera according to claim 2, wherein said control means comprises an EEPROM, and said switching between said first and second states is realized by changing the content of said EEPROM.

4. A camera according to claim 2 or 3, wherein said first and second states are fixedly set when the camera is fabricated.

5. A camera, comprising:
   means for changing a condition of the camera from one in which photography cannot be carried out to another condition in which photography can be carried out;
   initial state setting means for setting a state of said camera to a prescribed state in response to said condition changing means; and
   selecting means for selecting an automatic program zoom mode in which a focal length of a photographing lens is automatically determined based on a prescribed program, and a manual zoom mode in which the focal length of said photographing lens is determined by an arbitrary operation; wherein
   said initial state setting means sets said camera in the automatic program zoom mode, regardless of the mode selected by said selecting means.

6. A camera according to claim 5, wherein said initial state setting means includes switching means capable of switching between a first state in which said automatic program mode is set in response to the condition changing means, and a second state in which said manual zoom mode is set.

7. A camera according to claim 6, wherein
   said initial state setting means comprises an EEPROM, and said first and second states are switched by changing the content of said EEPROM.

8. A camera according to claim 6 or 7, wherein said first and second states are fixedly set when said camera is fabricated.

9. A camera capable of photographing in a plurality of photographing modes, comprising:

an operating member for selecting one of said plurality of photographing modes;

means for automatically setting a prescribed mode out of said plurality of photographing modes regardless of a mode previously selected; and means for changing the previous mode set by said setting means.

10. A camera according to claim 9, wherein said plurality of photographing modes includes a flash pre-emission mode, and a normal flash emission mode.

11. A camera according to claim 9, wherein said plurality of photographing modes includes an APZ mode in which a focal length of the photographing lens is automatically determined based on a prescribed program, and a normal zoom mode.

12. A camera according to claim 9, further comprising memory means for storing said prescribed mode.

13. A camera according to claim 12, wherein said memory means includes an EEPROM.

14. A camera according to claim 19, wherein content of said memory means cannot be changed by a user.

15. A camera according to claim 13, wherein content of said EEPROM cannot be rewritten by a user.

16. A camera according to claim 9, wherein said plurality of photographing modes includes an APZ mode in which a focal length of the photographing lens is automatically determined based on a prescribed program, and a normal zoom mode, and wherein said APZ mode is set by operating said setting means.

17. A camera according to claim 9, wherein said plurality of photographing modes includes at least two of a flash auto emission mode, a flash force emission mode, and a flash emission prohibition mode.

18. A camera comprising:

operating means capable of operating in a first mode or a second mode different from the first mode when the camera is in a predetermined situation;

an EEPROM for storing data representing whether the operating means should be operated in the first or the second mode;

manipulating means located in a position where it cannot be easily manipulated by a user;

rewriting means for permitting the contents of the EEPROM to be rewritten, based on the manipulation of the manipulating means, from data representing operation of the first mode to data representing the operation of the second mode, and vice versa; and control means for controlling the operating means to operate in either the first or the second mode, based on the contents of the EEPROM.

19. A camera according to claim 18, further comprising;

a main switch, and wherein said predetermined situation is a change of the main switch from off to on.

20. A camera according to claim 18, further comprising;

a flash, and wherein the first mode is a mode wherein flash pre-emission is effected at the time of photography with the flash and the second mode is a mode without flash pre-emission.

* * * * *

UNITED STATES PATENT AND TRADEMARK OFFICE
CERTIFICATE OF CORRECTION

PATENT NO. : 5,848,304
APPLICATION NO. : 08/074740
DATED : December 8, 1998
INVENTOR(S) : Masayuki Ikemura Page 1 of 1

It is certified that error appears in the above-identified patent and that said Letters Patent is hereby corrected as shown below:

Claim 9, column 25, line 11 change the term "previous" to --prescribed--

Signed and Sealed this

Twenty-seventh Day of April, 2010

David J. Kappos
*Director of the United States Patent and Trademark Office*